US009320062B2

(12) United States Patent
Malladi et al.

(10) Patent No.: US 9,320,062 B2
(45) Date of Patent: Apr. 19, 2016

(54) COMMUNICATION IN A HETEROGENEOUS NETWORK WITH CARRIER AGGREGATION

(71) Applicant: QUALCOMM Incorporated, San Diego, CA (US)

(72) Inventors: Durga Prasad Malladi, San Diego, CA (US); Yongbin Wei, San Diego, CA (US); Aleksandar Damnjanovic, Del Mar, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 13/829,286

(22) Filed: Mar. 14, 2013

(65) Prior Publication Data

US 2013/0272187 A1 Oct. 17, 2013

Related U.S. Application Data

(60) Provisional application No. 61/625,556, filed on Apr. 17, 2012.

(51) Int. Cl.
| | | |
|---|---|---|
| H04W 76/02 | (2009.01) | |
| H04L 5/00 | (2006.01) | |
| H04W 36/18 | (2009.01) | |
| H04W 72/04 | (2009.01) | |
| H04W 72/12 | (2009.01) | |
| H04L 1/18 | (2006.01) | |
| H04L 1/00 | (2006.01) | |

(52) U.S. Cl.
CPC .............. *H04W 76/02* (2013.01); *H04L 5/001* (2013.01); *H04L 1/1812* (2013.01); *H04L 5/0053* (2013.01); *H04L 5/0055* (2013.01); *H04L 2001/0092* (2013.01); *H04W 36/18* (2013.01); *H04W 72/0453* (2013.01); *H04W 72/1278* (2013.01)

(58) Field of Classification Search
None
See application file for complete search history.

(56) References Cited

U.S. PATENT DOCUMENTS

| 8,239,721 B2 | 8/2012 | Pelletier et al. |
| 2010/0067435 A1 | 3/2010 | Balachandran et al. |

(Continued)

FOREIGN PATENT DOCUMENTS

| CN | WO 2011137775 A1 * 11/2011 | ............ H04W 36/08 |
| WO | WO-2009155480 A1 | 12/2009 |

(Continued)

OTHER PUBLICATIONS

Iwamura M., et al., "Carrier Aggregation Framework in 3GPP LTE-Advanced" WIMAX/LTE Update, IEEE Communications Magazine, Aug. 2010, pp. 60-67.

(Continued)

*Primary Examiner* — Benjamin H Elliott, IV
(74) *Attorney, Agent, or Firm* — Norton Rose Fulbright US LLP

(57) ABSTRACT

A communication environment with carrier aggregation (CA) is disclosed in which a UE is configured for communication at a first time with a first network node via a primary component carrier (PCC) and a second network node via a secondary CC (SCC). At a second time, the UE is configured for communication with a third network node via the SCC at a second time. The UE maintains communication with the first network node via the PCC without triggering handover at the UE during the establishing communication with the third network node.

80 Claims, 12 Drawing Sheets

(56) References Cited

U.S. PATENT DOCUMENTS

| | | | |
|---|---|---|---|
| 2011/0134774 A1* | 6/2011 | Pelletier | H04W 52/365 370/252 |
| 2011/0201323 A1* | 8/2011 | Wu | H04L 5/001 455/418 |
| 2011/0205978 A1 | 8/2011 | Nory et al. | |
| 2011/0268029 A1* | 11/2011 | Tseng | H04L 5/003 370/328 |
| 2011/0281578 A1* | 11/2011 | Narasimha | H04L 5/001 455/423 |
| 2012/0033624 A1 | 2/2012 | Luo et al. | |
| 2012/0076021 A1 | 3/2012 | Sambhwani | |
| 2012/0087257 A1 | 4/2012 | Larsson et al. | |
| 2012/0281600 A1* | 11/2012 | Tseng et al. | 370/280 |
| 2013/0028117 A1* | 1/2013 | Montojo et al. | 370/252 |
| 2013/0083661 A1* | 4/2013 | Gupta | H04W 4/005 370/235 |
| 2013/0165130 A1* | 6/2013 | Wu | H04W 36/08 455/444 |

FOREIGN PATENT DOCUMENTS

| | | |
|---|---|---|
| WO | WO-2009155780 A1 | 12/2009 |
| WO | WO-2011097523 A1 | 8/2011 |
| WO | WO-2012034035 A1 | 3/2012 |

OTHER PUBLICATIONS

Wannstrom J., "Carrier Aggregation Explained," 3GPP, May 2012, 4 pages.

International Search Report and Written Opinion—PCT/US2013/034979—ISA/EPO—Dec. 19, 2013.

Partial International Search Report—PCT/US2013/034979—ISA/EPO—Nov. 13, 2013.

* cited by examiner

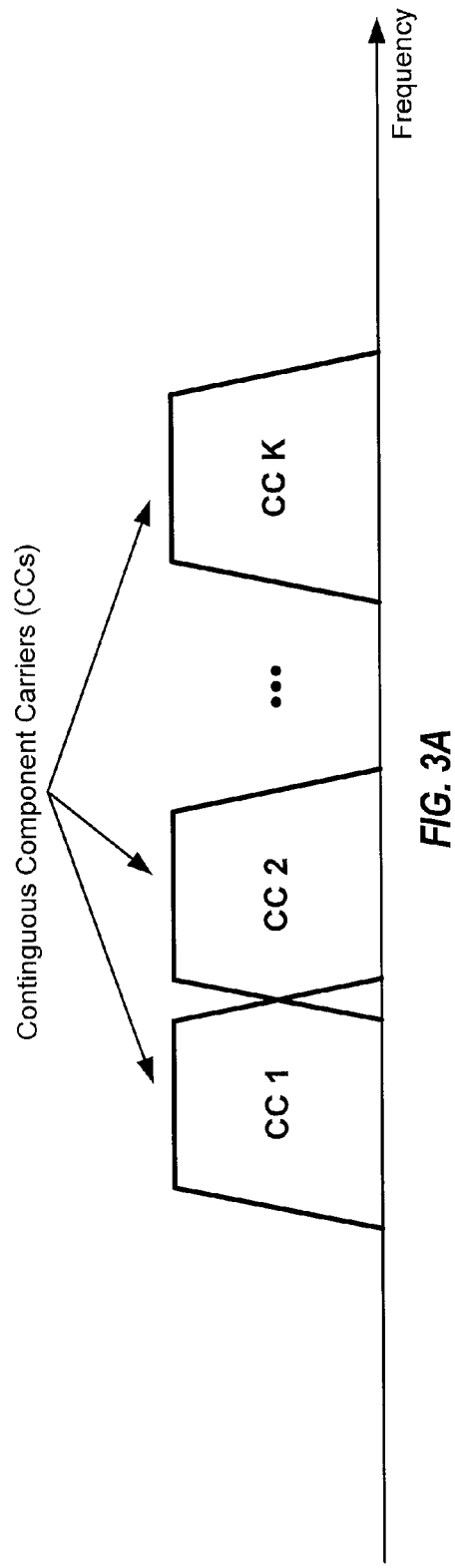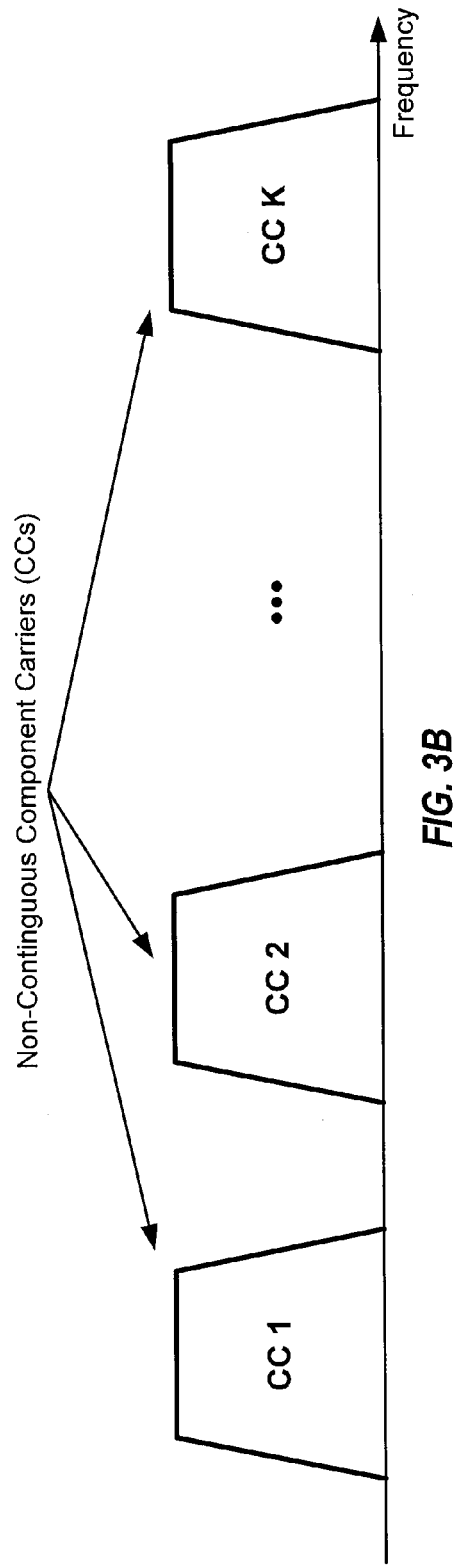

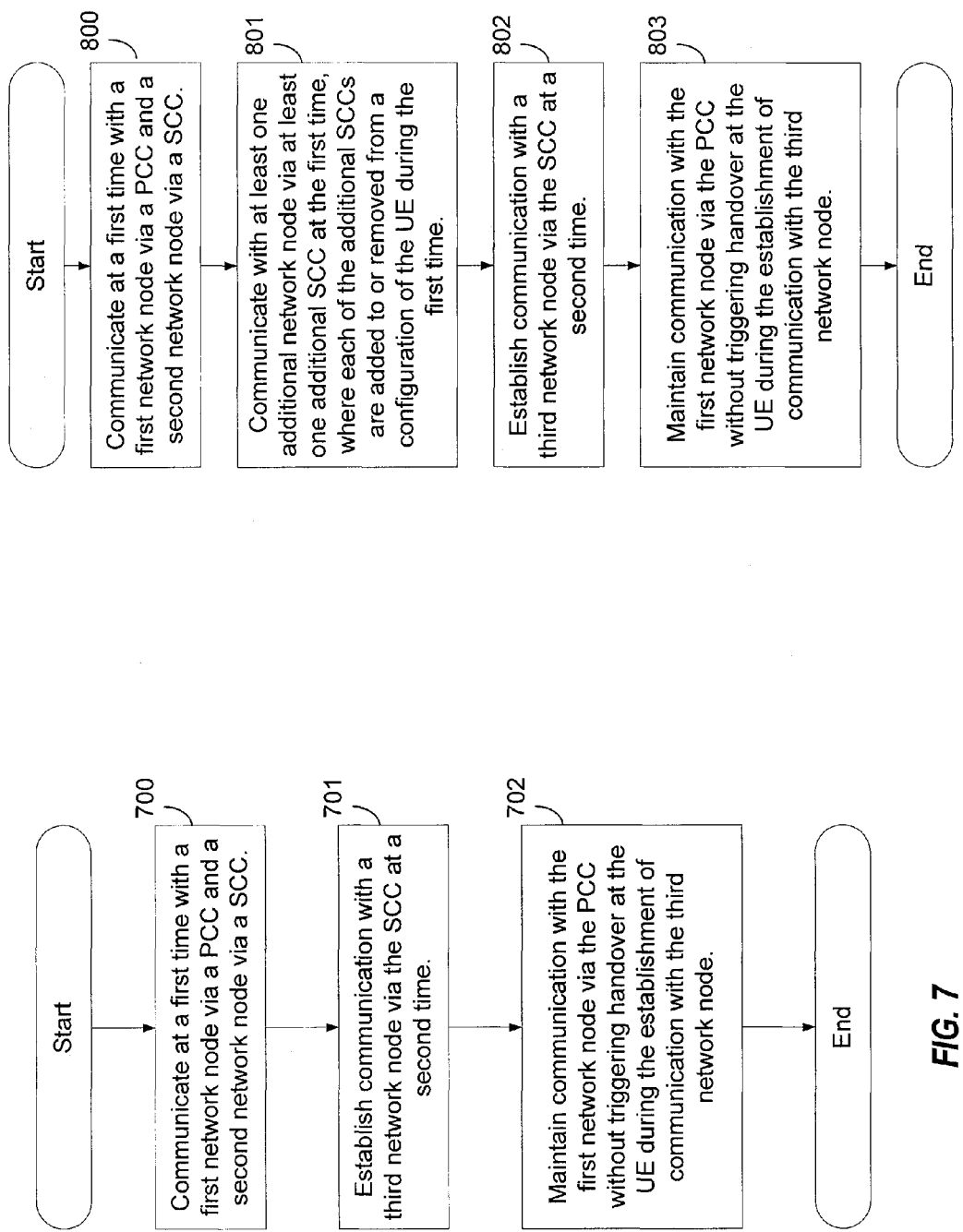

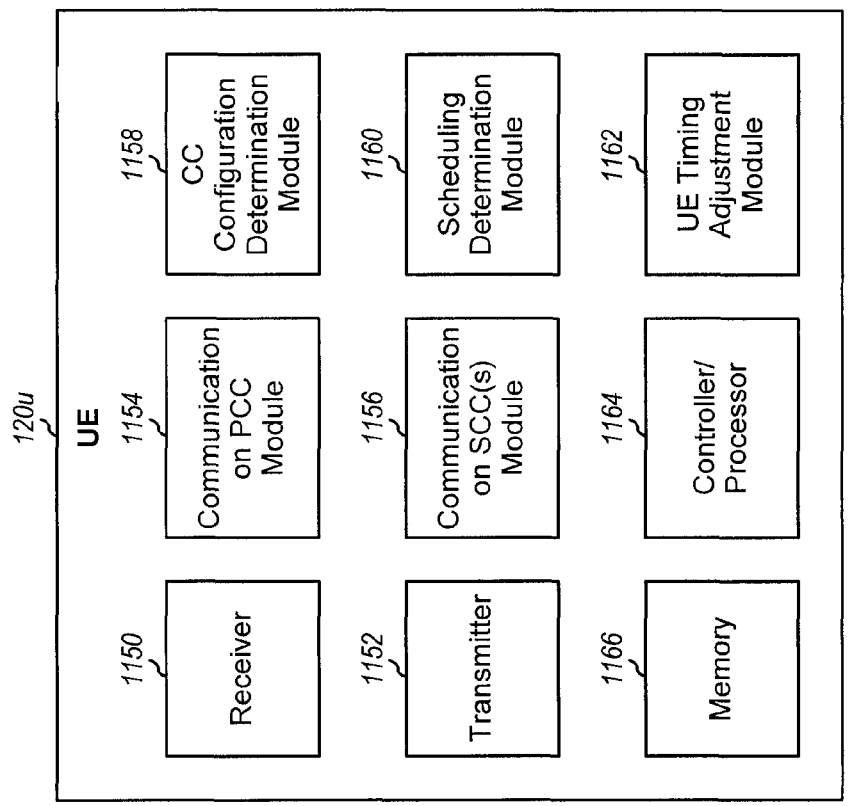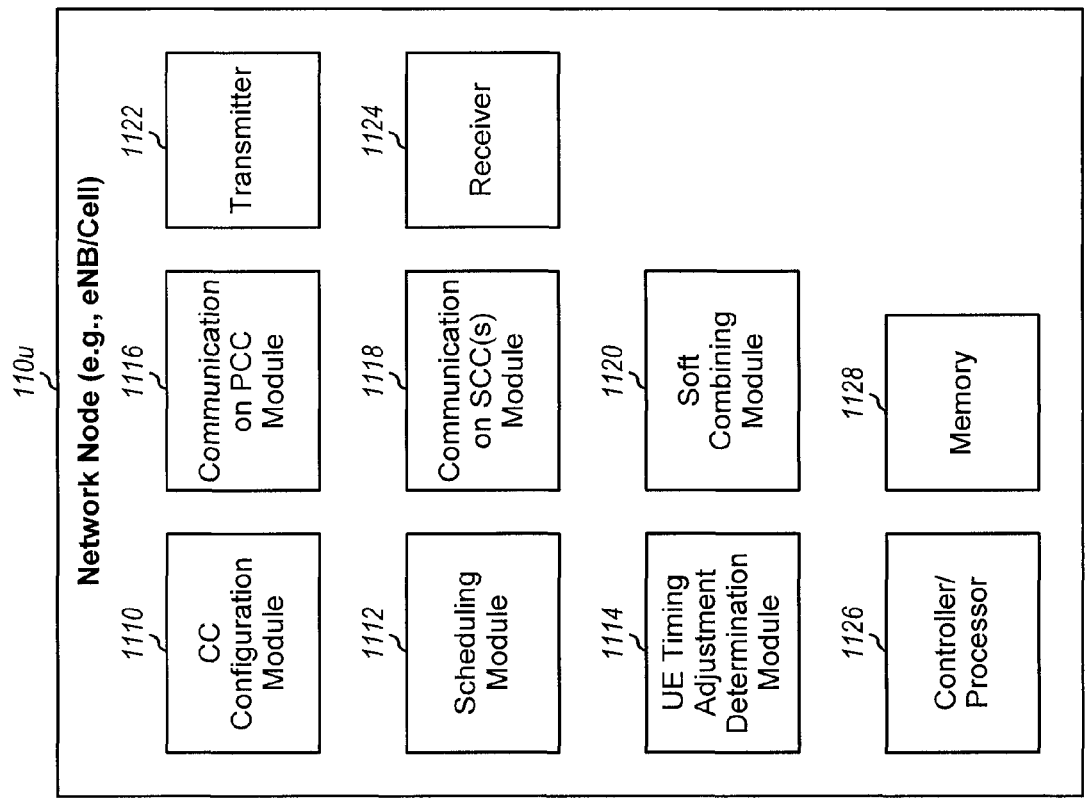
FIG. 11

COMMUNICATION IN A HETEROGENEOUS NETWORK WITH CARRIER AGGREGATION

CROSS-REFERENCE TO RELATED APPLICATIONS

This application claims the benefit of U.S. Provisional Patent Application No. 61/625,556, entitled, "COMMUNICATION IN A HETEROGENEOUS NETWORK WITH CARRIER AGGREGATION", filed on Apr. 17, 2012, which is expressly incorporated by reference herein in its entirety.

BACKGROUND

I. Field

The present disclosure relates generally to communicating in a heterogeneous network (HetNet).

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Various aspects of the present disclosure are directed to a method for wireless communication that includes communicating at a first time, by a user equipment (UE), with a first network node via a primary component carrier (PCC) and a second network node via a secondary component carrier (SCC), establishing communication, by the UE, with a third network node via the SCC at a second time, and maintaining communication with the first network node via the PCC without triggering handover at the UE during the establishing communication with the third network node.

Additional aspects of the present disclosure are directed to a method for wireless communication that includes configuring a UE with a PCC for communication with a first network node at a first time and a SCC for communication with a second network node, configuring the UE with the SCC for communication with a third network node at a second time after the first time, and configuring the UE to maintain communication with the first network node via the PCC during the configuring the UE for communication with the third network node, wherein handover is not performed for the UE while the UE communicates with the first network node via the PCC.

Further aspects of the present disclosure are directed to a method for wireless communication that includes obtaining first symbol estimates for a first uplink transmission sent on a PCC from a UE to a first network node, obtaining second symbol estimates for the first uplink transmission from a second network node receiving the first uplink transmission, the UE concurrently communicating with the first network node on the PCC and with the second network node on a SCC, combining the first and second symbol estimates to obtain first combined symbol estimates for the first uplink transmission, and decoding the first combined symbol estimates to recover data sent in the first uplink transmission by the UE.

Further aspects of the present disclosure are directed to an apparatus for wireless communication that includes means for communicating at a first time, by a UE, with a first network node via a PCC and a second network node via a SCC, means for establishing communication, by the UE, with a third network node via the SCC at a second time, and means for maintaining communication with the first network node via the PCC without triggering handover at the UE during the means for establishing communication with the third network node.

Further aspects of the present disclosure are directed to an apparatus for wireless communication that includes means for configuring a UE with a PCC for communication with a first network node at a first time and a SCC for communication with a second network node, means for configuring the UE with the SCC for communication with a third network node at a second time after the first time, and means for configuring the UE to maintain communication with the first network node via the PCC during the means for configuring the UE for communication with the third network node, wherein handover is not performed for the UE while the UE communicates with the first network node via the PCC.

Further aspects of the present disclosure are directed to an apparatus for wireless communication that includes means for obtaining first symbol estimates for a first uplink transmission sent on a PCC from a UE to a first network node, means for obtaining second symbol estimates for the first uplink transmission from a second network node receiving the first uplink transmission, the UE concurrently communicating with the first network node on the PCC and with the second network node on a SCC, means for combining the first and second symbol estimates to obtain first combined symbol estimates for the first uplink transmission, and means for decoding the first combined symbol estimates to recover data sent in the first uplink transmission by the UE.

Further aspects of the present disclosure are directed to a computer program product for wireless communications in a wireless network that includes a non-transitory computer-readable medium having program code recorded thereon. The program code includes code for causing a computer to communicate at a first time, by a UE, with a first network node via a PCC and a second network node via a SCC, code for causing a computer to establish communication, by the UE, with a third network node via the SCC at a second time, and code for causing a computer to maintain communication with the first network node via the PCC without triggering handover at the UE during execution of the program code for causing a computer to establish communication with the third network node.

Further aspects of the present disclosure are directed to a computer program product for wireless communications in a wireless network that includes a non-transitory computer-readable medium having program code recorded thereon. The program code includes code for causing a computer to configure a UE with a PCC for communication with a first network node at a first time and a SCC for communication with a second network node, code for causing a computer to configure the UE with the SCC for communication with a third network node at a second time after the first time, and code for causing a computer to configure the UE to maintain communication with the first network node via the PCC during the configuring the UE for communication with the third network node, wherein handover is not performed for the UE while the UE communicates with the first network node via the PCC.

Further aspects of the present disclosure are directed to a computer program product for wireless communications in a wireless network that includes a non-transitory computer-readable medium having program code recorded thereon. The program code includes code for causing a computer to obtain first symbol estimates for a first uplink transmission sent on a PCC from a UE to a first network node, code for causing a computer to obtain second symbol estimates for the first uplink transmission from a second network node receiving the first uplink transmission, the UE concurrently communicating with the first network node on the PCC and with the second network node on a SCC, code for causing a computer to combine the first and second symbol estimates to obtain first combined symbol estimates for the first uplink transmission, and code for causing a computer to decode the first combined symbol estimates to recover data sent in the first uplink transmission by the UE.

Further aspects of the present disclosure are directed to an apparatus configured for wireless communication that includes at least one processor and a memory coupled to the processor. The processor is configured to communicate at a first time, by a UE, with a first network node via a PCC and a second network node via a SCC, to establish communication, by the UE, with a third network node via the SCC at a second time, and to maintain communication with the first network node via the PCC without triggering handover at the UE during establishment of communication with the third network node.

Further aspects of the present disclosure are directed to an apparatus configured for wireless communication that includes at least one processor and a memory coupled to the processor. The processor is configured to configuring a UE with a PCC for communication with a first network node at a first time and a SCC for communication with a second network node, to configure the UE with the SCC for communication with a third network node at a second time after the first time, and to configure the UE to maintain communication with the first network node via the PCC during the configuring the UE for communication with the third network node, wherein handover is not performed for the UE while the UE communicates with the first network node via the PCC.

Further aspects of the present disclosure are directed to an apparatus configured for wireless communication that includes at least one processor and a memory coupled to the at least one processor. The processor is configured to obtain first symbol estimates for a first uplink transmission sent on a PCC from a UE to a first network node, to obtain second symbol estimates for the first uplink transmission from a second network node receiving the first uplink transmission, the UE concurrently communicating with the first network node on the PCC and with the second network node on a SCC, to combine the first and second symbol estimates to obtain first combined symbol estimates for the first uplink transmission, and to decode the first combined symbol estimates to recover data sent in the first uplink transmission by the UE.

BRIEF DESCRIPTION OF THE DRAWINGS

FIGS. 3A and 3B are diagrams illustrating example configurations of component carriers.

FIG. 7 is a functional block diagram illustrating example blocks executed to implement one aspect of the present disclosure.

FIG. 8 is a functional block diagram illustrating example blocks executed to implement one aspect of the present disclosure.

FIG. 11 is a block diagram illustrating an example network node and UE configured according to one aspect of the present disclosure.

DETAILED DESCRIPTION

Techniques for communicating in a HetNet with carrier aggregation are disclosed herein. These techniques may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
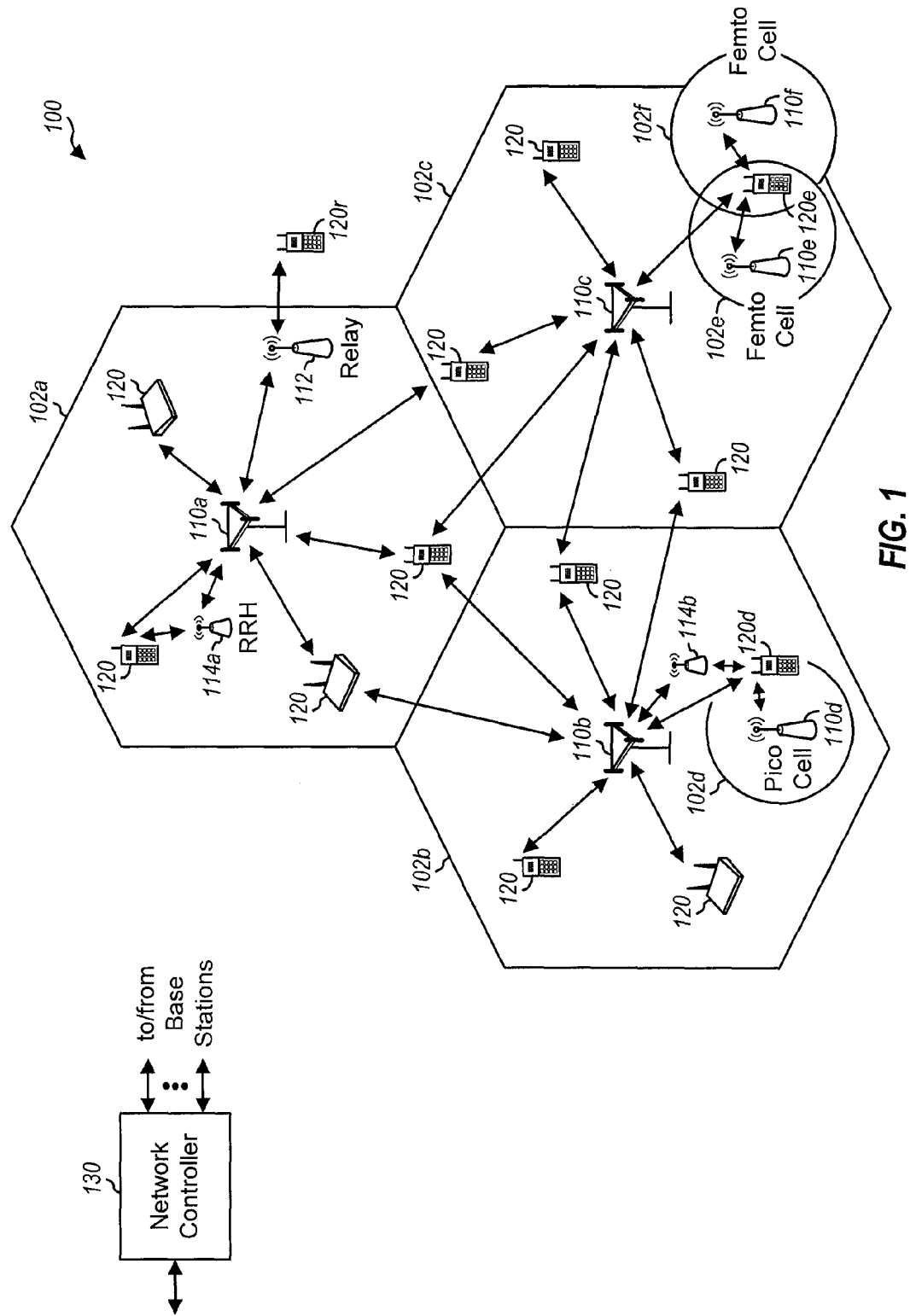
FIG. 1 is a block diagram conceptually illustrating an example of a mobile communication system.

FIG. 1 shows a wireless communication network 100, which may be an LTE network or some other wireless network. Wireless network 100 may include a number of evolved Node Bs (eNBs) 110 and other network entities. An eNB may be a station or node that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. eNB 110d may be a pico eNB for a pico cell 102d. eNBs 110e and 110f may be home eNBs for femto cells 102e and 102f, respectively. An eNB may support one or multiple (e.g., three) cells. The terms "eNB", "cell", and "base station" may be used interchangeably.

Wireless network 100 may also include relays. A relay may be a station or node that receives a transmission of data from an upstream station (e.g., an eNB or a UE) and sends a transmission of the data to a downstream station (e.g., a UE or an eNB). A relay may also be a UE that relays transmissions for other UEs. In the example shown in FIG. 1, a relay 112 may communicate with eNB 110a and a UE 120r in order to facilitate communication between eNB 110a and UE 120r. Relay 112 may appear like a UE to eNB 110a and may appear like an eNB to UE 120r.

Wireless network 100 may also include remote radio heads (RRHs). An RRH may be a remote unit that can support radio frequency (RF) transmission and reception. An eNB may include one or more RRHs, which may be located away from the eNB. The eNB may be coupled to the RRHs via a wireline backhaul (e.g., fiber optics) using standard interface. The eNB may communicate with UEs via the RRHs.

Wireless network 100 may also include other network entities. For example, a network controller 130 may couple to a set of eNBs and provide coordination and control for these eNBs. Network controller 130 may communicate with the eNBs via a backhaul. The eNBs may also communicate with one another, e.g., directly or indirectly via wireless or wireline backhaul.

Wireless network 100 may be a HetNet that includes network nodes of different types. A network node may be a macro eNB/cell, a pico eNB/cell, a home eNB/femto cell, a relay, an RRH, etc. For example, wireless network 100 may include macro eNBs/cells, pico eNBs/cells, home eNBs/femto cells relays, RRHs, etc., which may have different transmit power levels, different coverage areas, and different impact on interference in wireless network 100. Macro eNBs/cells may have a high transmit power level (e.g., 5 to 40 Watts) whereas pico eNBs/cells, home eNBs/femto cells, and relays may have lower transmit power levels (e.g., 0.1 to 2 Watts). Wireless network 100 may be a dense or a very dense HetNet. The density of a HetNet may be quantified by an eNB-to-UE ratio, and a very dense HetNet may have a low eNB-to-UE ratio approaching 1:1 (or possibly exceeding 1:1 with more eNBs than UEs).

UEs 120 may be dispersed throughout wireless network 100, and each UE may be stationary or mobile. A UE may also be referred to as a terminal, a mobile station, a subscriber unit, a station, etc. A UE may be a cellular phone, a smartphone, a tablet, a personal digital assistant (PDA), a wireless modem, a wireless communication device, a handheld device, a laptop computer, a cordless phone, a wireless local loop (WLL) station, etc. A UE may be able to communicate with one or more network nodes (e.g., one or more macro cells, pico cells, femto cells, relays, RRHs, etc.) at any given moment.

Wireless network 100 may support data transmission with hybrid automatic retransmission (HARQ) in order to improve reliability. For HARQ, a transmitter (e.g., an UE) may send an initial transmission of a packet of data and may send one or more additional transmissions of the packet, if needed, until the packet is decoded correctly by a receiver (e.g., an eNB/cell), or the maximum number of transmissions of the packet has occurred, or some other termination condition is encountered. After each transmission of the packet, the receiver may decode all received transmissions of the packet to attempt to recover the packet. The receiver may send an acknowledgement (ACK) if the packet is decoded correctly or a negative acknowledgement (NAK) if the packet is decoded in error. The transmitter may send another transmission of the packet if a NAK is received and may terminate transmission of the packet if an ACK is received. Data may be transmitted based on an HARQ timeline, which may indicate when to send ACK/NAK feedback and when to send a retransmission for a given transmission of data sent at a particular time. For example, an HARQ timeline of 8 milliseconds (ms) may be used in which, for a given transmission of data sent at time t, ACK/NAK feedback may be sent 4 ms later at time t+4, and a retransmission may be sent 8 ms later at time t+8.

Figure 2:
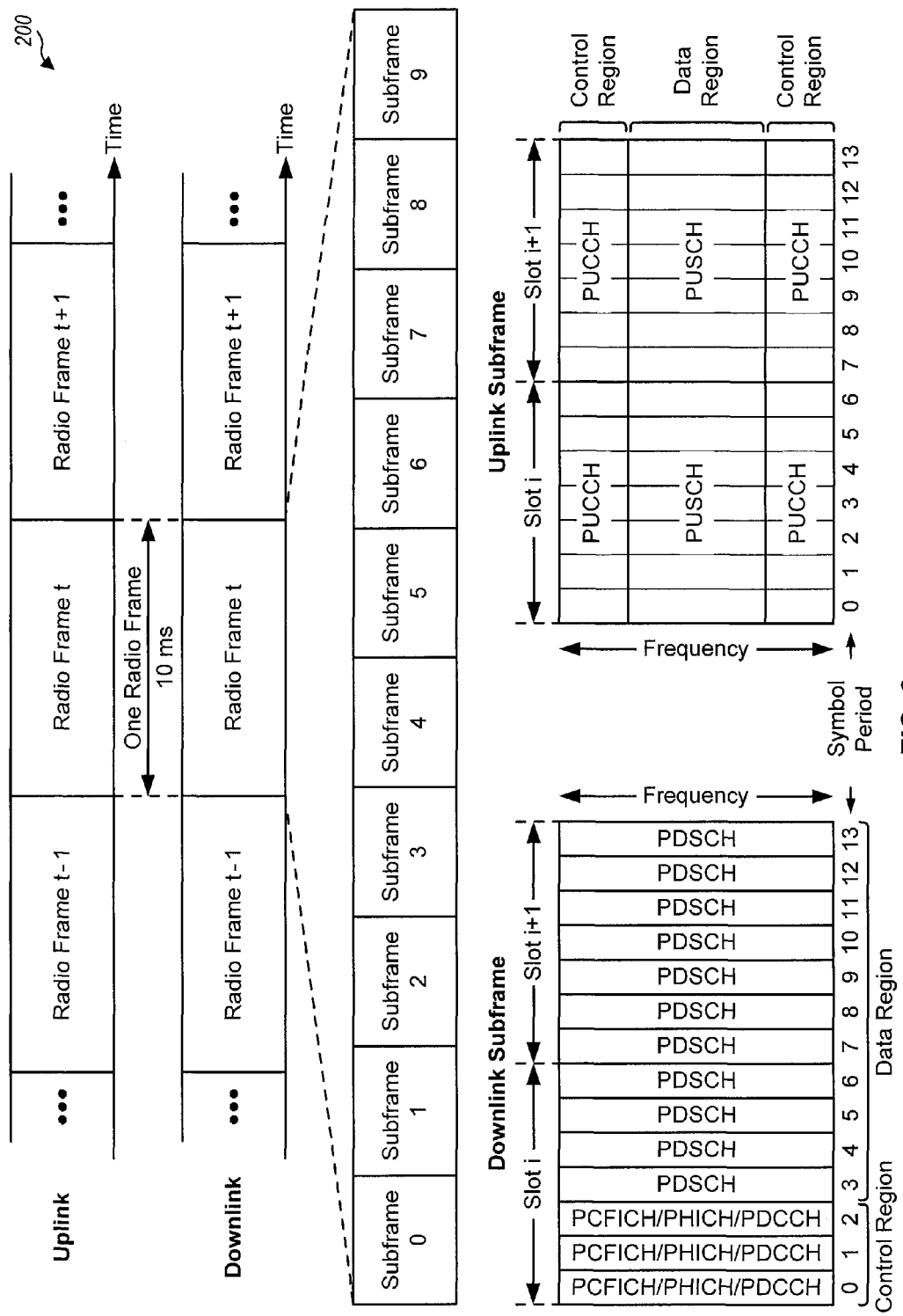
FIG. 2 is a block diagram conceptually illustrating an example of a downlink frame structure in a mobile communication system.

FIG. 2 shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L-1.

A cell may transmit a Physical Control Format Indicator Channel (PCFICH), a Physical HARQ Indicator Channel (PHICH), a Physical Downlink Control Channel (PDCCH), and/or other physical channels in a control region of a subframe for the downlink (or downlink subframe). The PCFICH may convey the number of symbol periods (M) used for the control region of the downlink subframe, where M may be equal to 1, 2 or 3 and may change from subframe to subframe. The PDCCH may carry downlink control information (DCI) such as downlink grants, uplink grants, etc. The PHICH may carry ACK/NAK feedback for data transmission sent on the uplink with HARQ. The cell may also transmit a Physical Downlink Shared Channel (PDSCH) and/or other physical channels in a data region of a downlink subframe. The PDSCH may carry data for UEs scheduled for data transmission on the downlink.

A UE may transmit either a Physical Uplink Control Channel (PUCCH) in a control region of a subframe for the uplink (or uplink subframe) or a Physical Uplink Shared Channel (PUSCH) in a data region of the uplink subframe. The PUCCH may carry uplink control information (UCI) such as channel state information (CSI), ACK/NAK feedback, scheduling request, etc. The PUSCH may carry data and/or UCI. The various signals and channels in LTE are described in 3GPP TS 36.211, entitled "Evolved Universal Terrestrial Radio Access (E-UTRA); Physical Channels and Modulation," which is publicly available.

Wireless network 100 may support operation on multiple component carriers (CCs), which may be referred to as carrier aggregation (CA) or multi-carrier operation. A CC may refer to a range of frequencies used for communication and may be associated with certain characteristics. For example, a CC may be associated with system information defining operation on the CC. A CC may also be referred to as a carrier, a frequency channel, a cell, etc.

A UE may be configured with multiple CCs for the downlink and one or more CCs for the uplink for carrier aggregation. A cell may send data and control information on one or more CCs to the UE. The UE may send data and control information on one or more CCs to the cell.

FIG. 3A shows an example of continuous carrier aggregation. Multiple (K) CCs may be available for communication and may be adjacent to each other, where K may be any integer value.

FIG. 3B shows an example of non-continuous carrier aggregation. Multiple (K) CCs may be available for communication and may be separated from each other.

In LTE Release 10, a UE may be configured with up to five CCs for carrier aggregation. Each CC may have a bandwidth of up to 20 MHz and may be backward compatible with LTE Release 8. The UE may thus be configured with up to 100 MHz for up to five CCs in LTE Release 10. One CC may be designated as a primary CC (PCC), and each remaining CC may be designated as a secondary CC (SCC). A cell may send a control information on the PDCCH on the PCC to the UE. The UE may send control information on the PUCCH on the PCC to the cell. In LTE Release 10, a UE may communicate with a single network node (e.g., a serving cell) on all CCs configured for that UE.

In an aspect of the disclosure, carrier aggregation may be used to support communication in a dense HetNet. A dense HetNet may refer to a deployment of many network nodes of different types in a relatively small geographic area. These network nodes may include macro cells, pico cells, relays, RRHs, etc. For example, many pico cells, relays, and/or RRHs may be widely deployed (e.g., on light poles, within buildings and homes, inside stores, etc.) throughout the coverage of a macro cell. A dense HetNet may then include the macro cell as well as the pico cells, relays, and/or RRHs within the coverage of the macro cell. For example, the macro cell may have a coverage area of 1 to 2 kilometers (km) radius and may include hundreds of pico cells, relays, and/or RRHs. Deployment of network nodes of different types may greatly increase the capacity of the HetNet. Multiple CCs may be used to support communication with the network nodes in the HetNet in order to further increase network capacity. For example, in some instances, network capacity of the dense HetNet may be hundreds or thousand times greater than network capacity of a single macro cell.

Figure 4A:
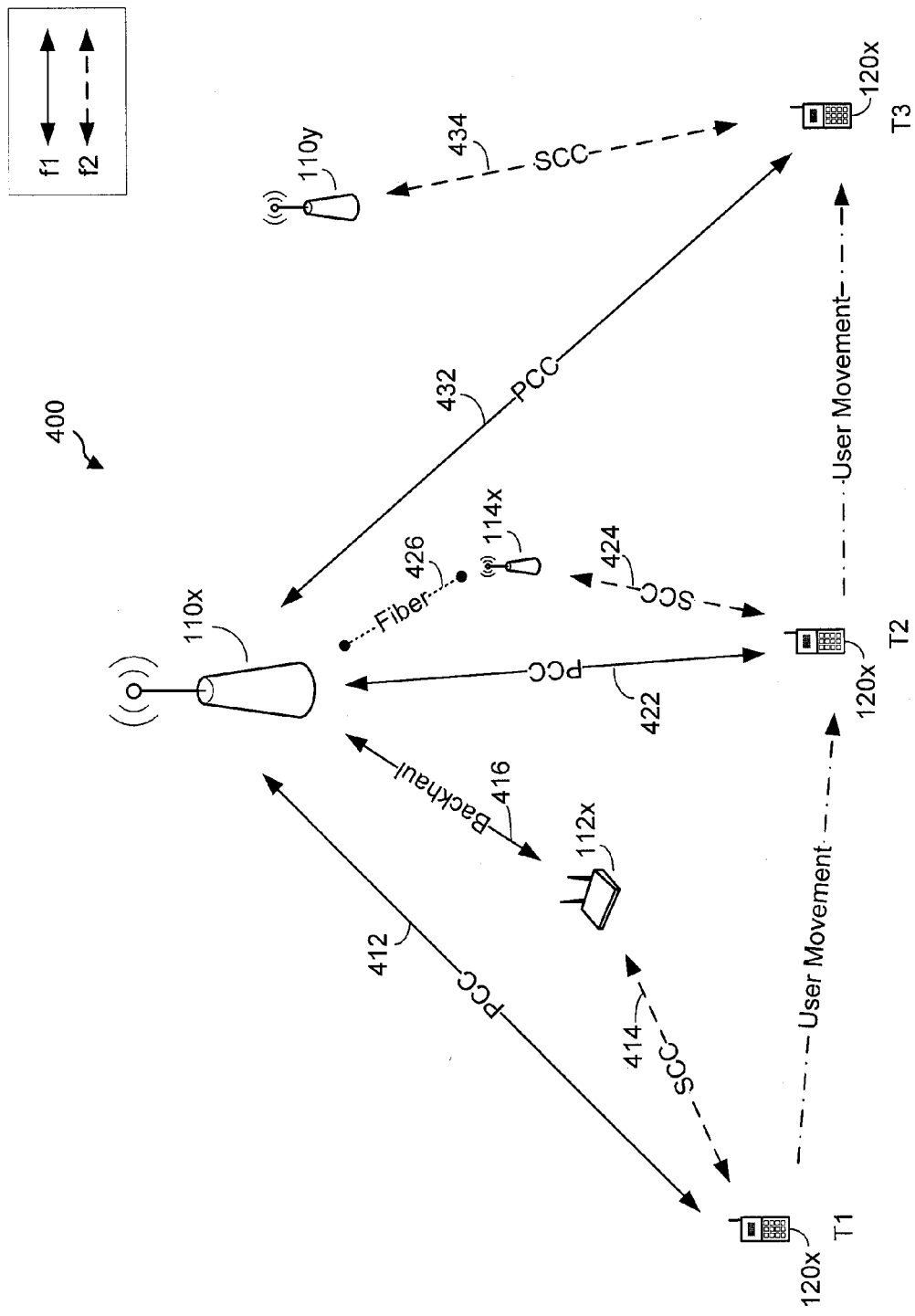
FIGS. 4A and 4B are block diagrams illustrating example wireless networks configured for carrier aggregation.

FIG. 4A shows an exemplary HetNet 400 with carrier aggregation. In FIG. 4A, a cell 110x may be a macro cell or a pico cell and may support communication for UEs within its coverage area. Cell 110x may include a centralized baseband unit and/or a centralized control unit. A cell 110y may be a pico cell located within the coverage area of cell 110x. A relay 112x may relay transmissions for cell 110x, which may be a donor cell for relay 112x. An RRH 114x may support RF transmission and reception for cell 110x. On the downlink, RRH 114x may receive data from cell 110x, generate a downlink signal comprising the data, and transmit the downlink signal to UEs. On the uplink, RRH 114x may receive uplink signals sent by UEs, process the uplink signals to obtain symbol estimates or decoded data, and send the symbol estimates or decoded data to cell 110x.

A UE 120x may communicate with cell 110x via a direct link 412 at time T1. UE 120x may be one of the UEs in FIG. 1. UE 120x may also communicate with cell 110x via relay 112x at time T1. Relay 112x may communicate with UE 120x via an access link 414 and with cell 110x via a backhaul link 416. Backhaul link 416 may typically be a wireless link but may also be a wireline link. UE 120x may be mobile and may move to a new location at time T2, which may be K1 seconds or minutes later than time T1, where K1 may be any value. At time T2, UE 120x may communicate with cell 110x via a direct link 422 and also with RRH 114x via a secondary link 424. RRH 114x may communicate with cell 110x via a wireline (e.g., fiber optics) backhaul 426. UE 120x may move to a new location at time T3, which may be K2 seconds or minutes later than time T2, where K2 may be any value. At time T3, UE 120x may communicate with cell 110x via a direct link 432 and also with cell 110y via a direct link 434.

In one aspect of the disclosure, a UE may concurrently communicate with multiple network nodes via different CCs for carrier aggregation. In one design, the UE may communicate with a serving cell via a PCC and zero or more SSCs and may also communicate with one or more other network nodes via one or more SCCs. The use of multiple CCs may improve capacity and performance, especially in a dense HetNet.

In the example shown in FIG. 4A, two CCs may be available and may include a PCC at frequency f1 and an SCC at frequency f2. Cell 110x may be a serving cell of UE 120x. At time T1, UE 120x may communicate with cell 110x via the PCC on frequency f1 and may communicate with relay 112x via the SCC on frequency f2. Relay 112x may communicate with cell 110x via the PCC. At time T2, UE 120x may communicate with cell 110x via the PCC and may communicate with RRH 114x via the SCC. RRH 114x may communicate with cell 110x via a wireline backhaul. At time T3, UE 120x may communicate with cell 110x via the PCC and may communicate with pico cell 110y via the SCC.

There may be many network nodes in a dense HetNet. A UE may rapidly move in and out of coverage of different cells within the HetNet. If the UE performs handover to the strongest cell at any given moment, then the UE may perform handover frequently as the UE moves about the dense HetNet. Each handover may be associated with signaling and other overhead. It may be desirable to minimize the number of handovers performed by the UE as it moves about the dense HetNet.

In another aspect of the disclosure, a PCC may be maintained for a UE for communication with a network node (e.g., a serving cell), and SCCs may be added to or removed from a configuration of the UE. The UE may perform handover whenever there is a change in PCC from one network node to another network node. By maintaining the PCC while adding and/or removing SCCs, the number of handovers for the UE may be reduced.

In the example shown in FIG. 4A, UE 120x may communicate with cell 110x via the PCC at times T1, T2 and T3. The PCC may thus remain the same for UE 120x from time T1 to time T3. UE 120x may communicate with different network nodes via the SCC at different times. In particular, UE 120x may communicate with relay 112x via the SCC at time T1, then with RRH 114x via the SCC at time T2, and then with pico cell 110y via the SCC at time T3. UE 120x may add the SCC from relay 112x, then remove the SCC from relay 112x and add the SCC from RRH 114x, and then remove the SCC from RRH 114x and add the SCC from pico cell 110y. However, UE 120x may avoid performing handover since the PCC has not changed from time T1 to time T3 even though the SCC has changed multiple times.

In general, a PCC and an SCC may have the same bandwidth or different bandwidths. The PCC and SCC may be contiguous (e.g., as shown in FIG. 3A) or non-contiguous (e.g., as shown in FIG. 3B).

In general, any information may be sent via a PCC and an SCC. In one design, designated control information (e.g., scheduling/grant information, ACK/NAK feedback, etc.) may be sent on the PCC. In another design, certain types of traffic/data may be sent on the PCC, and other types of traffic/data may be sent on the SCC. For example, voice traffic may be sent on the PCC whereas best-effort traffic may be sent on the SCC. The PCC and SCC may be associated with different quality-of-service (QoS) levels. In this case, the PCC and SCC may be more suitable for carrying different types of traffic/data based on the QoS requirements of the different traffic/data types.

In yet another aspect of the disclosure, soft combining and/or HARQ may be enabled or disabled for uplink transmissions, e.g., depending on whether multiple CCs are enabled on the uplink and whether communication on a CC is via an RRH or a relay. Soft combining refers to combining of symbol estimates from different sources (e.g., different network nodes, different antennas, etc.) prior to decoding. The symbol estimates may be estimates of transmitted modulation symbols. Soft combining may result in accumulation of more energy for the transmitted modulation symbols, which may improve decoding performance.

Referring to FIG. 4A, at time T2, UE 120x may concurrently send a first uplink transmission on the PCC to cell 110x and a second uplink transmission on the SCC to RRH 114x. Cell 110x may receive the first uplink transmission intended for cell 110x as well as the second uplink transmission intended for RRH 114x. Cell 110x may derive first symbol estimates based on the first uplink transmission received on the PCC and second symbol estimates based on the second uplink transmission received on the SCC. Similarly, RRH 114x may receive the second uplink transmission intended for RRH 114x as well as the first uplink transmission intended for cell 110x. RRH 114x may derive third symbol estimates based on the second uplink transmission received on the SCC and fourth symbol estimates based on the first uplink transmission received on the PCC. RRH 114x may forward the third and fourth symbol estimates to cell 110x via backhaul 426.

Cell 110x may obtain the first symbol estimates determined by cell 110x for the first uplink transmission and the fourth symbol estimates determined by RRH 114x for first uplink transmission. Cell 110x may combine the first and fourth symbol estimates in a manner known in the art to obtain first combined symbol estimates for the first uplink transmission. Cell 110x may then decode the first combined symbol estimates to recover data sent by UE 120x in the first uplink transmission. Similarly, cell 110x may obtain the second symbol estimates determined by cell 110x for the second uplink transmission and the third symbol estimates determined by RRH 114x for second uplink transmission. Cell 110x may combine the second and third symbol estimates to obtain second combined symbol estimates for the second uplink transmission. Cell 110x may then decode the second combined symbol estimates to recover data sent by UE 120x in the second uplink transmission. Soft combining the first and fourth symbol estimates may improve the likelihood of correctly decoding the data sent by UE 120x in the first uplink transmission. Soft combining the second and third symbol estimates may improve the likelihood of correctly decoding the data sent by UE 120x in the second uplink transmission.

UE 120x may typically adjust its transmit timing independently for each network node receiving an uplink transmission from UE 120x. In the example shown in FIG. 4A, at time T2, UE 120x may adjust its transmit timing for the first uplink transmission to cell 110x based on first timing adjustments from cell 110x. Cell 110x may determine the first timing adjustments for UE 120x such that the first uplink transmission from UE 120x is properly time-aligned at cell 110x. Similarly, UE 120x may adjust is transmit timing for the second uplink transmission to RRH 114x based on second timing adjustments RRH 114x. RRH 114x may determine the second timing adjustments for UE 120x such that the second uplink transmission from UE 120x is properly time-aligned at RRH 114x.

In one design, the transmit timing of a UE for uplink transmissions to multiple network nodes may be adjusted such that good performance can be achieved for soft combining on the uplink. In the example shown in FIG. 4A, the first timing adjustments from cell 110x and the second timing adjustments from RRH 114x may be determined for UE 120x such that good performance can be obtained for (i) soft combining of symbol estimates determined by cell 110x and RRH 114x for the first uplink transmission on the PCC and/or (ii) soft combining of symbol estimates determined by cell 110x and RRH 114x for the second uplink transmission on the SCC. For example, the transmit timing of UE 120x for the first uplink transmission may be set to t1 if adjusted based solely on timing adjustments from cell 110x. The transmit timing of UE 120x for the second uplink transmission may be set to t2 if adjusted based solely on timing adjustments from RRH 114x. The difference between t1 and t2 may be relatively large for various reasons. The transmit timing of UE 120x for the first uplink transmission may be skewed toward t2, and the transmit timing of UE 120x for the second uplink transmission may be skewed toward t1 in order to improve performance of soft combining on the uplink. The amount of skew may be dependent on various factors such as the difference between t1 and t2, the loading at cell 110x and the loading at RRH 114x, the received power of UE 120x at cell 110x and RRH 114x, etc. In one design, the amount of skew may be dependent on a weighted average of the received uplink transmissions at cell 110x and RRH 114x. For example, the uplink timing of UE 120x may be skewed more toward a target uplink timing of UE 120x for a network node (e.g., cell 110x or RRH 114x) having a higher received power or a higher received signal quality for an uplink transmission from UE 120x.

HetNet 400 in FIG. 4A may have one or more of the following characteristics:
1. PCC may be from the same macro or pico cell,
2. SCC(s) may be activated or de-activated from different network nodes (e.g., relays, RRHs, pico cells, etc.) as UE moves through the HetNet,
   a. SSC(s) may be used for both downlink and uplink or only downlink, and
   b. SSC(s) may have same or different cell ID as PCC,
3. Seamless mobility for UE since no handover may be triggered as long as the PCC is from the same cell, and
4. Generic scalable architecture with
   a. Independent configuration of PCC and SCC(s) for UE, and
   b. Support for multiple SCCs can be activated for UE from multiple cells.

Figure 4B:
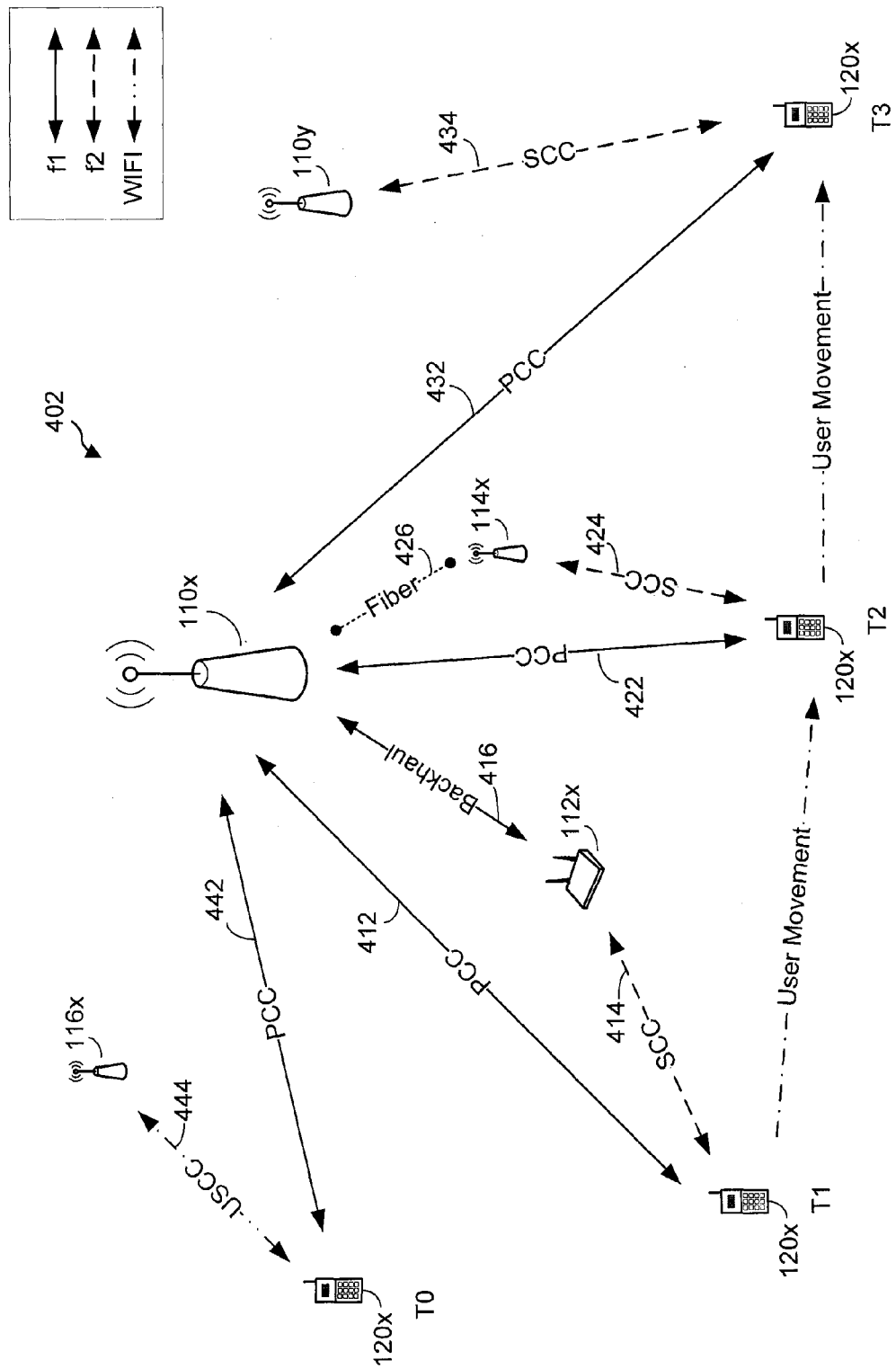

FIG. 4B shows an exemplary HetNet 402 with carrier aggregation. HetNet 402 includes macro/pico cell 110x, pico cell 110y, relay 112x, and RRH 114x in HetNet 400 in FIG. 4A. HetNet 402 further includes an access point 116x, which may implement IEEE 802.11 (Wi-Fi), Hiperlan, etc.

At time T0, UE 120x may communicate with cell 110x via direct link 442 and within access point 116x via a secondary link 444. At time T1, which may be K0 seconds or minutes later than time T0, UE 120x may communicate with cell 110x via direct link 412 and also with relay 112x via secondary link 424. At time T2, UE 120x may communicate with cell 110x via direct link 422 and also with RRH 114x via secondary link 424. At time T3, UE 120x may communicate with cell 110x via direct link 432 and also with cell 110y via direct link 434.

In the example shown in FIG. 4B, two CCs may be available and may include a PCC at frequency f1 and an SCC at frequency f2. Cell 110x may be a serving cell of UE 120x. At time T0, UE 120x may communicate with cell 110x via the PCC on frequency f1 and may communicate with access point 116x via an unlicensed frequency, which may be referred to as an unlicensed SCC. The unlicensed frequency may be in an ISM band at 2.4 GHz or some other band. UE may communicate with cell 110x, relay 112x, RRH 114x, and pico cell 110y as described above for FIG. 4A.

HetNet 402 in FIG. 4B may have one or more of the following characteristics:
1. PCC may be from the same macro or pico cell,
2. SCC(s) may be activated or de-activated from different network nodes (e.g., relays, RRHs, pico cells, access points, etc.) as UE moves through the HetNet,
   a. SSC(s) may be used for both downlink and uplink or only downlink,
   b. SSC(s) may have same or different cell ID as PCC, and
   c. unlicensed spectrum may be used for communication with access points,
3. Seamless mobility for UE since no handover may be triggered as long as the PCC is from the same cell, and
4. Generic scalable architecture with
   a. Independent configuration of PCC and SCC(s) for UE, and
   b. Support for multiple SCCs can be activated for UE from multiple cells.

In general, a UE may concurrently communicate with a network node via a PCC and with any number of additional network nodes via any number of SCCs. The UE may communicate with a single additional network node via a single SCC, as shown in FIG. 4A. The UE may also communicate with a single additional network node via multiple SCCs. The UE may also communicate with multiple additional network nodes via multiple SCCs.

In one design, an SCC may be used for both the downlink and uplink, as shown in FIG. 4A, with two-ended arrows being shown for secondary links 414, 424 and 434. This design may allow for soft combining of an uplink transmission sent by a UE on a CC and received at different network nodes. For example, RRH 114x may send symbol estimates for a first uplink transmission sent by UE 120x to cell 110x as well as symbol estimates for a second uplink transmission sent by UE 120x to RRH 114x. The symbol estimates determined by RRH 114x may be combined with symbol estimates determined by cell 110x for the first and second uplink transmissions from UE 120x, as described above.

In another design, an SCC may be used for only the downlink, which may be referred to as supplemental downlink. In this design, control information for data transmission on the PCC as well as the SCC may be sent on the PCC since the SCC is not available for uplink transmission. For example, UE 120x may receive a first downlink transmission from cell 110x via the PCC and a second downlink transmission from RRH 114x via the SCC. UE 120x may send ACK/NAK for the first downlink transmission as well as ACK/NAK for the second downlink transmission on the PCC to cell 110x. Cell 110x may forward the ACK/NAK for the second downlink transmission to RRH 114x. Since cell 110x may perform common baseband processing for downlink transmissions from cell 110x and RRH 114x, the same HARQ timeline may be used for downlink transmissions by cell 110x and RRH 114x to UE 120x. An SCC used for only the downlink may also be operated as a simplified SCC carrying broadcast traffic/data and unacknowledged mode (UM) traffic/data. UM traffic/data may include unicast data with no HARQ and no ACK/NAK feedback. An example of UM traffic/data may be Voice-over-Internet Protocol (VoIP).

In one design, a PCC and an SCC for different network nodes may be associated with the same cell identity (ID). For example, the PCC for cell 110x and the SCC for RRH 114x in FIG. 4A may be associated with the same cell ID. In this case, RRH 114x may appear like a different antenna of cell 110x. In this design, control information may be sent in the control region of a downlink subframe on both the PCC and SCC.

In another design, a PCC and an SCC for different network nodes may be associated with different cell IDs. For example, the PCC for cell 110x in FIG. 4A may be associated with a first cell ID, and the SCC for RRH 114x may be associated with a second cell ID. In this case, RRH 114x may appear like a different cell than cell 110x. In this design, different control information may be sent in the control region of a downlink subframe on the PCC and SCC. The control space for the downlink may increase via use of different cell IDs for the PCC and SCC.

In one design, centralized scheduling may be used for UEs served by different network nodes on different CCs. For example, in FIG. 4A, cell 110x may serve one or more UEs on the PCC, and RRH 114x may serve one or more UEs on the SCC. RRH 114x may be associated with cell 110x, which may perform baseband processing for both cell 110x and RRH 114x. A central scheduler may jointly schedule UEs communicating with only cell 110x, UEs communicating with only RRH 114x, and UEs communicating with both cell 110x and RRH 114x such that good overall performance can be achieved. Overall performance may be quantified by various metrics related to throughput, latency, etc.

In another design, de-centralized scheduling may be used for UEs served by different network nodes on different CCs. For example, in FIG. 4A, cell 110x may serve one or more UEs, and relay 112x may serve one or more UEs. Relay 112x may have cell 110x as its donor cell. A scheduler for cell 110x may schedule the UEs served by cell 110x such that good performance can be achieved. Another scheduler for relay 112x may schedule the UEs served by relay 112x such that good performance can be achieved.

Carrier aggregation may be used for various dense HetNets. Some exemplary dense HetNets with carrier aggregation are show below.

Figure 5:
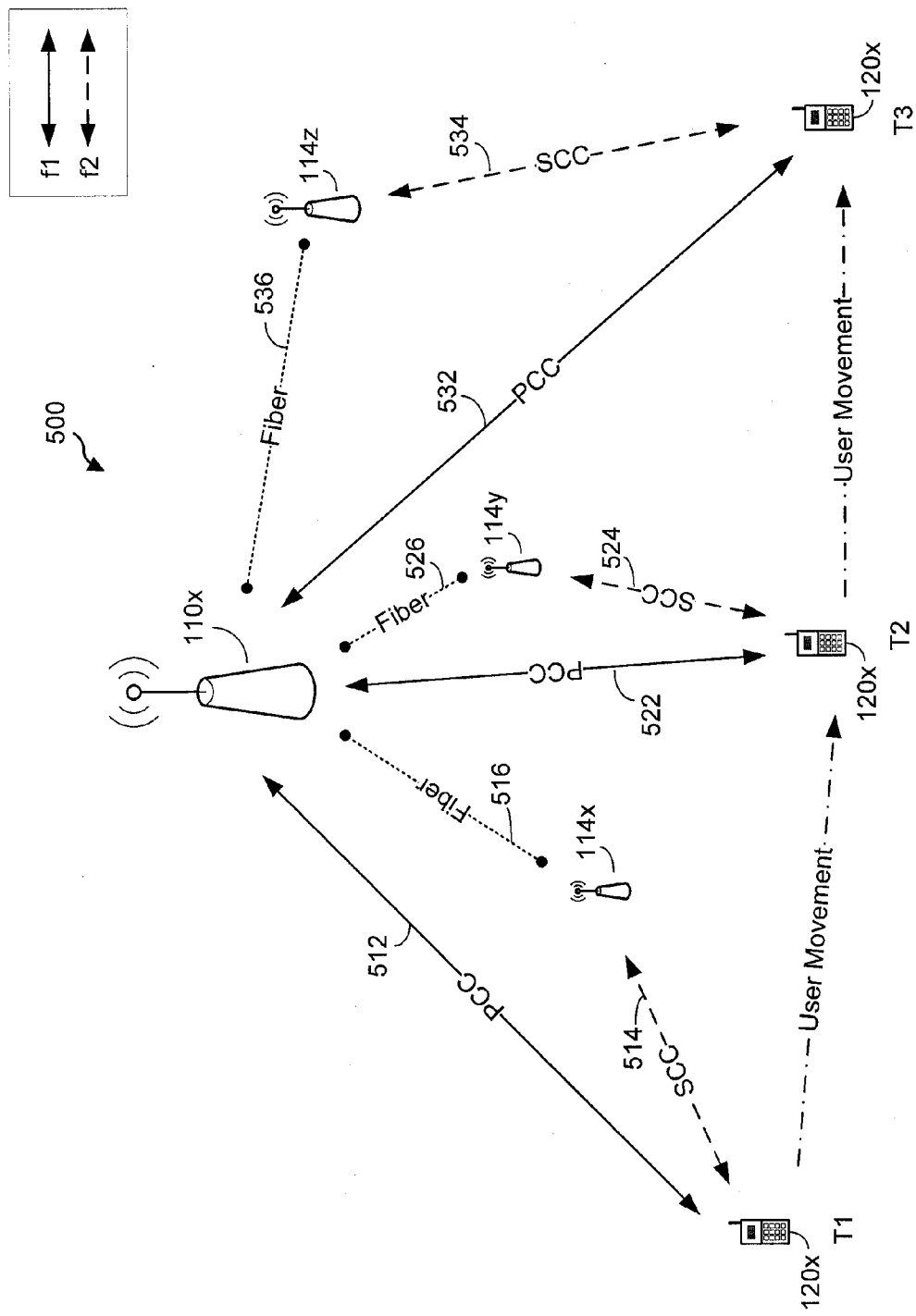
FIG. 5 is a block diagram illustrating an example wireless network configured for carrier aggregation.

FIG. 5 shows an exemplary HetNet 500 including macro/pico cell 110x and multiple RRHs 114 with carrier aggregation. In FIG. 5, cell 110x may be a macro cell or a pico cell and may support communication for UEs within its coverage area. RRHs 114x, 114y and 114z may support RF transmission and reception for cell 110x.

At time T1, UE 120x may communicate with cell 110x via a direct link 512 and also with RRH 114x via a secondary link 514. RRH 114x may communicate with cell 110x via a wireline backhaul 516. At time T2, UE 120x may communicate with cell 110x via a direct link 522 and also with RRH 114y via a secondary link 524. RRH 114y may communicate with cell 110x via a wireline backhaul 526. At time T3, UE 120x may communicate with cell 110x via a direct link 532 and also with RRH 114z via a secondary link 534. RRH 114z may communicate with cell 110x via a wireline backhaul 536.

Different network nodes may serve UE 120x via different CCs. In the example shown in FIG. 5, two CCs may be available and may include a PCC at frequency f1 and an SCC at frequency f2. At time T1, UE 120x may communicate with cell 110x via the PCC on frequency f1 and may communicate with RRH 114x via the SCC on frequency f2. At time T2, UE 120x may communicate with cell 110x via the PCC and may communicate with RRH 114y via the SCC. At time T3, UE 120x may communicate with cell 110x via the PCC and may communicate with RRH 114z via the SCC.

As also shown in FIG. 5, the PCC may remain the same for UE 120x, and the SCC may be added to or removed from a configuration of UE 120x. In the example shown in FIG. 5, UE 120x may communicate with cell 110x via the PCC at times T1, T2 and T3. The PCC may thus remain the same for UE 120x from time T1 to time T3, and no handover may be performed by UE 120x. UE 120x may communicate with different network nodes such as RRHs 114x, 114y and 114z via the SCC at different times.

HetNet 500 in FIG. 5 may have one or more of the following characteristics:
1. PCC may be from the same macro or pico cell,
2. SCC(s) may be activated or de-activated from different RRHs as UE moves through the HetNet,
    a. SSC(s) may be used for both downlink and uplink or only downlink, and
    b. SSC(s) may have same or different cell ID as PCC,
3. High-speed (e.g., fiber optic) backhaul between RRHs and cell may allow for
    a. Centralized scheduling for downlink across PCC and SCC(s),
    b. Soft combining of uplink transmissions on PCC and SCC(s),
    c. Flexibility in uplink timing adjustment of UE, and/or
    d. Common uplink for PCC and SCC(s), and
4. Seamless mobility for UE since no handover may be triggered as long as the PCC is from the same cell.

Figure 6:
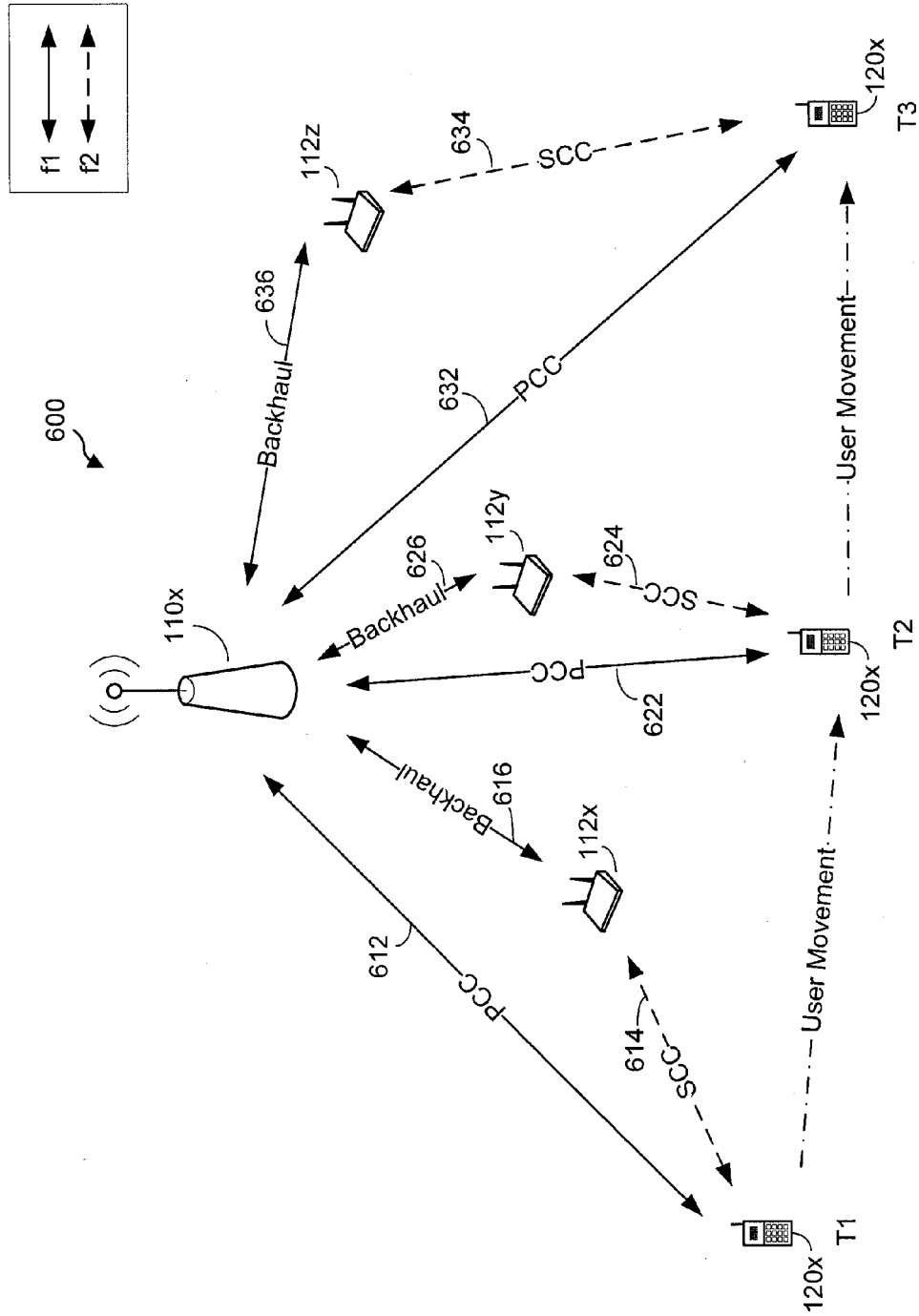
FIG. 6 is a block diagram illustrating an example wireless network with carrier aggregation configured according to one aspect of the present disclosure.

FIG. 6 shows an exemplary HetNet 600 including macro/pico cell 110x and multiple relays 112 with carrier aggregation. In FIG. 6, cell 110x may be a macro cell or a pico cell and may support communication for UEs within its coverage area. Relays 112x, 112y and 112z may be coupled to cell 110x and may relay transmissions for cell 110x.

At time T1, UE 120x may communicate with cell 110x via a direct link 612 and also with relay 112x via an access link 614. Relay 112x may communicate with cell 110x via a backhaul link 616. At time T2, UE 120x may communicate with cell 110x via a direct link 622 and also with relay 112y via an access link 624. Relay 112y may communicate with cell 110x via a backhaul link 626. At time T3, UE 120x may communicate with cell 110x via a direct link 632 and also with relay 112z via an access link 634. Relay 112z may communicate with cell 110x via a backhaul link 636.

Different network nodes may serve UE 120x via different CCs. In the example shown in FIG. 6, two CCs may be available and may include a PCC at frequency f1 and an SCC at frequency f2. At time T1, UE 120x may communicate with cell 110x via the PCC on frequency f1 and may communicate with relay 112x via the SCC on frequency f2. Relay 112x may communicate with cell 110x via the PCC. At time T2, UE 120x may communicate with cell 110x via the PCC and may communicate with relay 112y via the SCC. Relay 112y may communicate with cell 110x via the PCC. At time T3, UE 120x may communicate with cell 110x via the PCC and may communicate with relay 112z via the SCC. Relay 112z may communicate with cell 110x via the PCC.

As shown in FIG. 6, the PCC may remain the same for UE 120x, while the SCC may be added to or removed from a configuration of UE 120x. In the example shown in FIG. 6, UE 120x may communicate with cell 110x via the PCC at times T1, T2 and T3. The PCC may thus remain the same for UE 120x from time T1 to time T3, and no handover may be performed by UE 120x. UE 120x may communicate with different network nodes such as relays 112x, 112y and 112z via the SCC at different times.

HetNet 600 in FIG. 6 may have one or more of the following characteristics:
1. PCC may be from the same macro or pico cell,
2. SCC(s) may be activated or de-activated from different relays as UE moves through the HetNet,
    a. SSC(s) may be used for both downlink and uplink or only downlink, and
    b. SSC(s) may have cell ID(s) different from cell ID of PCC,
3. Wireless backhaul between relays and cell may allow for
    a. De-centralized scheduling for downlink across PCC and SCC(s),
    b. Common uplink for PCC and SCC(s), and/or
    c. Flexibility in uplink timing adjustment of UE,
4. PCC and SSC(s) may be independently configured for UE, and
5. Seamless mobility for UE since no handover may be triggered as long as the PCC is from the same cell,
    a. Simpler if donor cell transmits on PCC and serves relay on backhaul.

As long as UE 120x maintains connection to cell 110x via the PCC, no handover for UE 120x is triggered when communication via the SCC shifts from various additional network nodes, such as relays 112x, 112y, and 112z from times T1-T3. This feature reduces the additional overhead due to handover procedures, while maintaining the beneficial features of carrier aggregation through SCC communications.

In additional aspects, as UE 120x communicates via SCC with relays 112x, 112y, and 112z, relays 112x, 112y, and 112z communicate with cell 110x using a non-standard backhaul 616, 626, and 636, such as a non-fiber communication link. SCC communication through relays 112x, 112y, and 112z may then be coordinated through cell 110x.

FIG. 7 shows example blocks executed to implement one aspect for communicating on multiple CCs of the present disclosure. The example aspect may be performed by a UE (as described below) or by some other entity. The UE may communicate with a first network node via a PCC and a second network node via a SCC at a first time (block 700). The PCC may carry designated control information and possibly data and/or other information for the UE. The SCC may carry data and/or other information for the UE. In one design, the PCC and SCC may be independently configured for the UE. The first network node may comprise a serving cell of the UE. The second network node may comprise a pico cell, a relay, a remote radio head, or some other network entity. The second network node may also comprise an access point, and the SCC may be within an unlicensed band, e.g., as shown in FIG. 4B.

The UE may establish communication with a third network node via the SCC at a second time (block 701). The UE maintains communication with the first network node via the PCC without triggering handover at the UE while establishing communication with the third network node (block 702). Thus, the UE may switch communication from the second network node to the third network node on the SCC without the added overhead of handover.

In one design of blocks 700 and 701, the UE may send data to and receive data from the first network node via the PCC. The UE may also send data to and receive data from the second network node via the SCC. In this design, the SCC may serve as supplementary downlink and uplink for the UE. In another design of blocks 700 and 701, the UE may send data to and receive data from the first network node via the PCC. However, the UE may only receive data from the second network node via the SCC. In this design, the SCC may serve as a supplementary downlink for the UE.

The UE may receive at least one grant for data transmission on the PCC and SCC. In one design, scheduling of data transmission on the first and second CCs for the UE may be centralized. In another design, scheduling of data transmission on the PCC and SCC for the UE may be de-centralized.

The PCC and SCC may be used for data transmission in various manners. In general, any type of traffic/data may be sent on each CC, and data may be sent with or without HARQ on each CC. In one design, each type of traffic may be sent on each CC. In another design, different types of traffic may be sent on the PCC and SCC. For example, the PCC may carry traffic carrier, and the SCC may carry broadcast data. In one design, HARQ may be used for each CC. In another design, HARQ may be used for one CC and not for the other CC. For example, data may be sent with HARQ on the PCC and without HARQ on the SCC.

FIG. 8 shows example blocks executed to implement one aspect for communicating on multiple CCs of the present disclosure. The example aspect may be performed by a UE (as described below) or by some other entity. The UE may communicate at a first time with a first network node via a PCC and a second network node via a SCC (block 800). The PCC may be maintained for the UE during the entire first time period. The UE may communicate with at least one additional network node via at least one additional SCC at the first time, where each of the additional SCCs are added to or removed from a configuration of the UE during the first time (block 801). In one design, the PCC and the additional SCC(s) may be independently configured for the UE. The first network node may comprise a serving cell of the UE. The additional network node(s) may comprise a pico cell, a relay, a remote radio head, and/or other network entities. The additional network node(s) may also comprise an access point, and the additional SCC(s) may comprise a CC within an unlicensed band, e.g., as shown in FIG. 4B.

The UE may add an SCC for a second network node to the configuration of the UE during the first time period. Alternatively or additionally, the UE may remove the SCC for the second network node from the configuration of the UE during the first time period. The at least one additional SCC may comprise the SCC, and the at least one additional network node may comprise the second network node. The UE may not perform handover during the first time period while the UE communicates with the first network node on the PCC.

The UE may establish communication with a third network node via the SCC at a second time (block 802). The UE maintains communication with the first network node via the PCC also without triggering handover at the UE while establishing communication with the third network node in the second time (block 803). The PCC may carry designated control information and/or data of a first type (e.g., voice traffic, etc.) for the UE. The SCC(s) may carry data of a second type (e.g., best-effort traffic, broadcast traffic, etc.) and/or other information for the UE.

In one design of blocks 800-802, the UE may send data to and receive data from the first network node via the PCC. The UE may also send data to and receive data from the additional network node(s) via the additional SCC(s). In this design, the additional SCC(s) may serve as supplementary downlink and uplink for the UE. In another design of blocks 800-802, the UE may send data to and receive data from the first network node via the PCC. However, the UE may only receive data from the additional network node(s) via the additional SCC(s). In this design, the additional SCC(s) may serve as a supplementary downlink for the UE.

The UE may receive a first grant for data transmission on the PCC. The UE may receive at least one additional grant for data transmission on the additional SCC(s). In one design, scheduling of data transmission on the PCC and additional SCC(s) for the UE may be de-centralized. In another design, scheduling of data transmission on the PCC and additional SCC(s) for the UE may be centralized.

Figure 9:
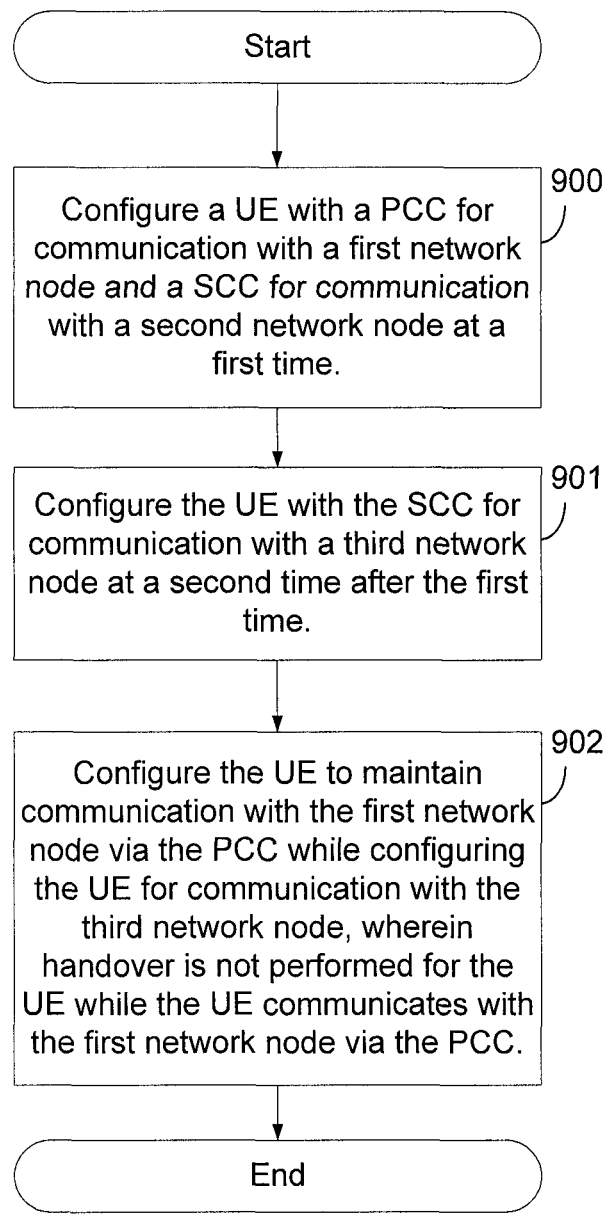
FIG. 9 is a functional block diagram illustrating example blocks executed to implement one aspect of the present disclosure.

FIG. 9 shows example blocks executed to implement one aspect for supporting communication on multiple CCs of the present disclosure. The example aspect may be performed by a network node (as described below) or by some other entity. A UE may be configured with a PCC for communication with a first network node at a first time and a SCC for communication with a second network node (block 900). The UE may be configured with the SCC for communication with a third network node at a second time after the first time (block 901). The UE may also be configured to maintain communication with the first network node via the PCC while configuring the UE for communication with the third network node, wherein handover is not performed for the UE while the UE communicates with the first network node via the PCC (block 902).

In one design, the PCC and SCC may be independently configured for the UE. The first network node may comprise a serving cell of the UE. The second network node may comprise a pico cell, a relay, or a remote radio head. In another design, a grant may be sent to the UE for data transmission on the PCC and SCC. In another design, a first grant may be sent to the UE for data transmission on the PCC, and a second grant may be sent to the UE for data transmission on the SCC. In one design, the UE may be scheduled for data transmission on the PCC and SCC with centralized scheduling. In another design, the UE may be scheduled for data transmission on the PCC and SCC with de-centralized scheduling. The PCC may carry designated control information and/or data of a first type for the UE. The SCC may carry data of a second type and/or other information for the UE.

In one design, the SCC may serve as supplementary downlink and uplink for the UE. In this design, the UE may (i) send data to and receive data from the first network node via the PCC and (ii) send data to and receive data from the second network node via the SCC. In another design, the SCC may serve as supplementary downlink for the UE. In this design, the UE may (i) send data to and receive data from the first network node via the first CC and (ii) only receive data from the second network node via the SCC.

The PCC and SCC may be used for data transmission in various manners. In general, any type of traffic/data may be sent on each CC, and data may be sent with or without HARQ on each CC. In one design, each type of traffic may be sent on each CC. In another design, different types of traffic may be sent on the PCC and SCC. For example, the PCC may carry traffic carrier, and the SCC may carry broadcast data. In one design, HARQ may be used for each CC. In another design, HARQ may be used for one CC and not for the other CC. For example, data may be sent with HARQ on the PCC and without HARQ on the SCC.

Figure 10:
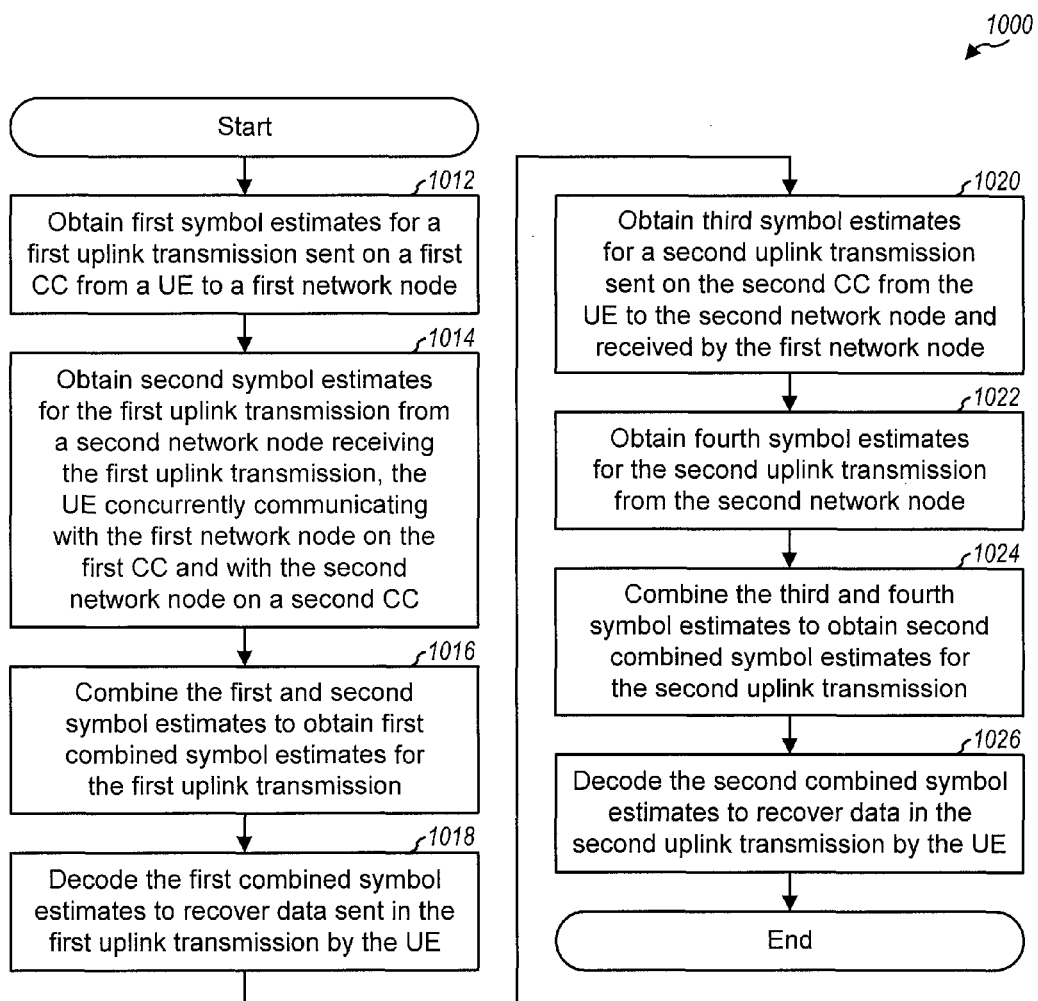
FIG. 10 is a functional block diagram illustrating example blocks executed to implement one aspect of the present disclosure.

FIG. 10 shows a design of a process 1000 for supporting communication. Process 1000 may be performed by a first network node, which may be a serving cell of a UE or some other entity. The first network node may obtain first symbol estimates for a first uplink transmission sent on a first CC from the UE to the first network node (block 1012). The first network node may also obtain second symbol estimates for the first uplink transmission from a second network node, which may also receive the first uplink transmission sent to the first network node (block 1014). The second network node may comprise another cell, a relay, a remote radio head, etc. The first UE may concurrently communicate with the first network node on the first CC and also with the second network node on a second CC. The first network node may combine the first and second symbol estimates to obtain first combined symbol estimates for the first uplink transmission (block 1016). The first network node may decode the first combined symbol estimates to recover data sent in the first uplink transmission by the UE (block 1018).

The first network node may obtain third symbol estimates for a second uplink transmission sent on the second CC from the UE to the second network node and received by the first network node (block 1020). The first network node may also obtain fourth symbol estimates for the second uplink transmission from the second network node, which may be the intended recipient of the second uplink transmission (block 1022). The first network node may combine the third and fourth symbol estimates to obtain second combined symbol estimates for the second uplink transmission (block 1024). The first network node may decode the second combined symbol estimates to recover data sent in the second uplink transmission by the UE (block 1026).

First transmit timing of the UE for the first uplink transmission may be adjusted, e.g., via timing adjustments sent by the first network node to the UE. Second transmit timing of the UE for the second uplink transmission may also be adjusted, e.g., via timing adjustments sent by the second network node to the UE. In one design, the first transmit timing and the second transmit timing of the UE may be adjusted to improve performance of uplink soft combining, e.g., to improve decoding performance of combined symbol estimates obtained from symbol estimates determined by the first and second network nodes for uplink transmissions sent by the UE.

FIG. 11 shows a block diagram of a design of a network node 110u and a UE 120u. Network node 110u may be one of the eNBs in FIG. 1 and/or may be the cell 110x in FIGS. 4 to 6. UE 120u may be one of the UEs in FIG. 1 and/or UE 120x in FIGS. 4 to 6.

Within network node 110u, a module 1110 may determine configurations of UE 120u and/or other UEs, e.g., determine which CCs are configured for UE 120u and which network node is communicating with UE 120u on each configured CC. A module 1112 may schedule UE 120u and other UEs for data transmission on the downlink and uplink. A module 1114 may adjust the transmit timing of UE 120u. A module 1116 may support communication with UE 120u and/or other UEs on a PCC, e.g., support data transmission to the UEs and data reception from the UEs on the PCC. A module 1118 may support communication with UE 120u and/or other UEs on one or more SCCs. A module 1120 may perform soft combining for uplink transmissions sent by UE 120u and/or other UEs. These uplink transmissions may be intended for network node 110u and/or other network nodes. A transmitter 1122 may generate one or more downlink signals for the PCC and/or SCC(s). A receiver 1116 may receive and process uplink signals transmitted by UE 120u and/or other UEs on the PCC and/or SCC(s). A controller/processor 1126 may direct the operation of various modules within network node 110u. A memory 1128 may store data and program codes for network node 110u.

Within UE 120u, a receiver 1150 may receive and process downlink signals from network node 110u and/or other network nodes. A transmitter 1160 may generate one or more uplink signals comprising the uplink transmissions intended for network node 110u and/or other network nodes. A module 1158 may determine a configuration of UE 120u, e.g., determine which CCs are configured for UE 120u and which network node to communicate with on each configured CC. A module 1160 may receive grants that schedule UE 120u for data transmission on the downlink and uplink. A module 1162 may adjust the transmit timing of UE 120u for each configured CC and/or each network node with which UE 120u is in communication. A module 1154 may support communication for UE 120u on a PCC, e.g., support data transmission to network nodes and data reception from the network nodes. A module 1156 may support communication for UE 120u on one or more SCCs. A controller/processor 1164 may direct the operation of various modules within UE 120u. A memory 1166 may store data and program codes for UE 120u.

The modules in FIG. 11 may comprise processors, electronic devices, hardware devices, electronic components, logical circuits, memories, software codes, firmware codes, etc., or any combination thereof.

Figure 12:
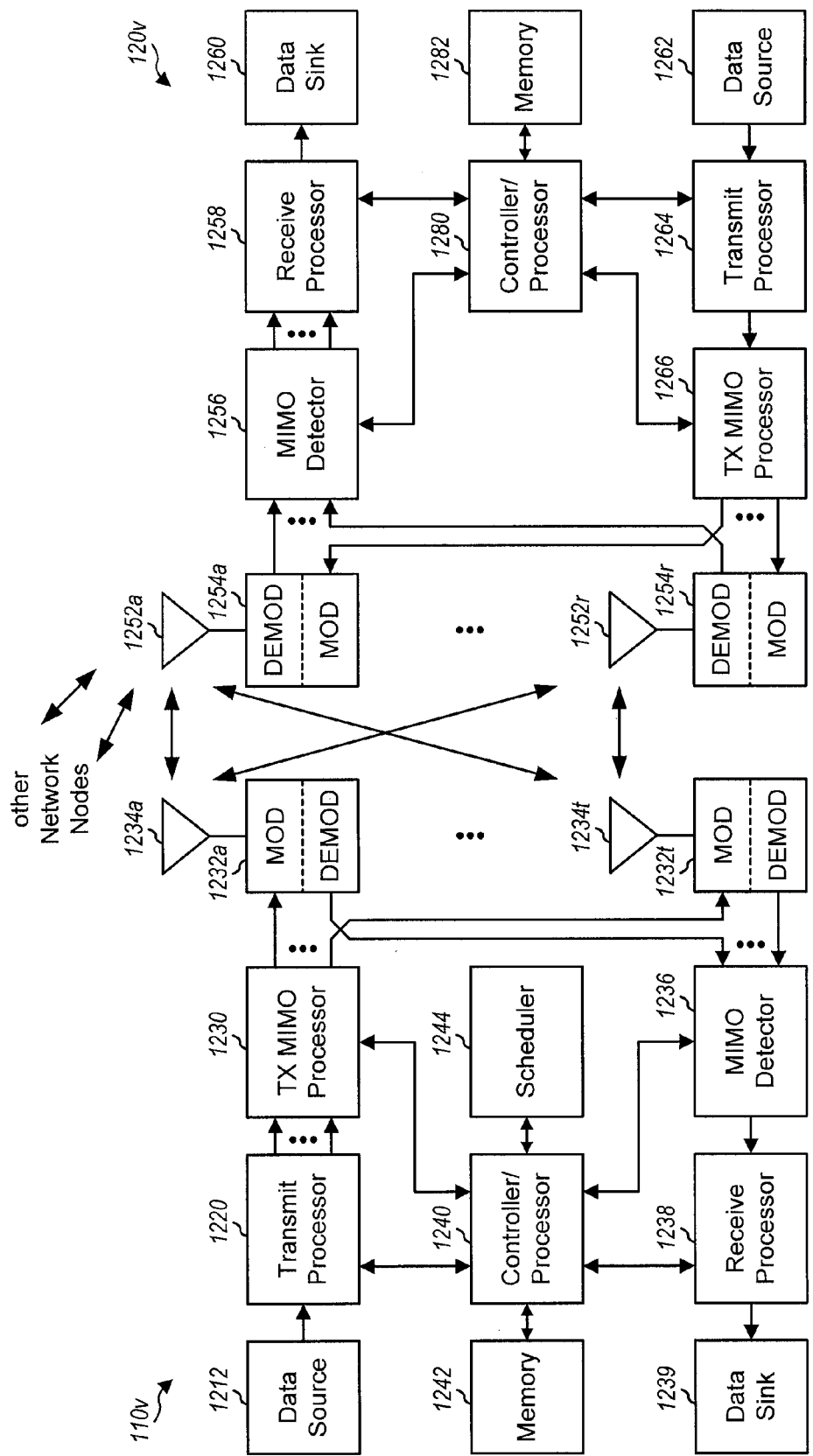
FIG. 12 is a block diagram illustrating a design of a network node and a UE configured according to one aspect of the present disclosure.

FIG. 12 shows a block diagram of a design of a network node 110v and a UE 120v. Network node 110v may be one of the eNBs in FIG. 1 and/or may be for cell 110x in FIGS. 4 to 6. UE 120v may be one of the UEs in FIG. 1 and/or UE 120x in FIGS. 4 to 6. Network node 110v may be equipped with T antennas 1234a through 1234t, and UE 120v may be equipped with R antennas 1252a through 1252r, where in general T≥1 and R≥1.

At network node 110v, a transmit processor 1220 may receive data from a data source 1212 for one or more UEs, process (e.g., encode and modulate) the data for each UE based on one or more modulation and coding schemes selected for that UE, and provide data symbols for all UEs. Transmit processor 1220 may also process control information (e.g., for configuration messages, grants, etc.) and provide control symbols. Processor 1220 may also generate reference symbols for reference signals. A transmit (TX) multiple-input-multiple-output (MIMO) processor 1230 may precode the data symbols, the control symbols, and/or the reference symbols (if applicable) and may provide T output symbol streams to T modulators (MOD) 1232a through 1232t. Each modulator 1232 may process its output symbol stream (e.g., for OFDM, etc.) to obtain an output sample stream. Each modulator 1232 may further condition (e.g., convert to analog, amplify, filter, and upconvert) its output sample stream to obtain a downlink signal. The downlink signal from each modulator 1232 may comprise data and control information sent on one or more CCs configured for each UE scheduled for data transmission on the downlink. T downlink signals from modulators 1232a through 1232t may be transmitted via T antennas 1234a through 1234t, respectively.

At UE 120v, antennas 1252a through 1252r may receive the downlink signals from network node 110v and/or other network nodes and may provide received signals to demodulators (DEMODs) 1254a through 1254r, respectively. Each demodulator 1254 may condition (e.g., filter, amplify, downconvert, and digitize) its received signal to obtain input samples. Each demodulator 1254 may further process the input samples (e.g., for OFDM, etc.) to obtain received symbols. A MIMO detector 1256 may obtain received symbols from all R demodulators 1254a through 1254r, perform MIMO detection, and provide detected symbols. A receive processor 1258 may process (e.g., demodulate and decode) the detected symbols, provide decoded data for UE 120v to a data sink 1260, and provide decoded control information to a controller/processor 1280.

At UE 120v, a transmit processor 1264 may receive and process data from a data source 1262 and control information from controller/processor 1280. Processor 1264 may also generate reference symbols for one or more reference signals. The symbols from transmit processor 1264 may be precoded by a TX MIMO processor 1266 if applicable, further processed by modulators 1254a through 1254r (e.g., for SC-FDM, OFDM, etc.), and transmitted. The uplink signal from each modulator 1254 may comprise data and control information sent on one or more CCs configured for UE 110v.

At network node 110v, the uplink signals from UE 120v and other UEs may be received by antennas 1234, processed by demodulators 1232, detected by a MIMO detector 1236 if applicable, and further processed by a receive processor 1238 to obtain decoded data and control information sent by UE 120v and other UEs. Processor 1238 may perform soft combining for uplink transmissions sent by UE 120v and received by multiple network nodes including network node 110v. Processor 1238 may provide the decoded data to a data sink 1239 and the decoded control information to controller/processor 1240.

Controllers/processors 1240 and 1280 may direct the operation at network node 110v and UE 120v, respectively. Processor 1240 and/or other processors and modules at network node 110v may perform or direct process 900 in FIG. 9, process 1000 in FIG. 10, and/or other processes for the techniques described herein. Processor 1280 and/or other processors and modules at UE 120v may perform or direct process 700 in FIG. 7, process 800 in FIG. 8, and/or other processes for the techniques described herein. Memories 1242 and 1282 may store data and program codes for network node 110v and UE 120v, respectively. A scheduler 1244 may schedule UEs for data transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communication, comprising:
communicating at a first time, by a user equipment (UE), with a first network node via a first primary component carrier (PCC) and a second network node via a secondary CC (SCC);
establishing communication, by the UE, with a third network node via the SCC at a second time following the first time; and
maintaining communication with the first network node via the first PCC without triggering handover from the first network node via the first PCC to another network via a second PCC at the UE during the establishing communication with the third network node at the second time or between the first time and the second time.

2. The method of claim 1, further comprising:
deactivating communication with the second network node via the SCC after leaving a coverage area of the second network node, wherein the deactivating fails to trigger handover at the UE.

3. The method of claim 1, further comprising:
communicating with at least one additional network node by the UE via at least one additional SCC at the first time.

4. The method of claim 3, each of the at least one additional network node being added to or removed from a configuration of the UE during the first time.

5. The method of claim 1, further comprising:
receiving at least one grant for data transmission on the first PCC and SCC.

6. The method of claim 5, wherein scheduling of data transmission for the UE on the first PCC and SCC is centralized.

7. The method of claim 1, wherein the first PCC carries designated control information for the UE, and wherein the SCC carries data for the UE.

8. The method of claim 1, wherein the first PCC and the SCC are independently configured for the UE.

9. The method of claim 1, wherein the second network node comprises an access point, and wherein the SCC is within an unlicensed band.

10. The method of claim 1, wherein the second network node comprises a relay.

11. The method of claim 1, wherein the communicating with the first network node comprises sending data to and receiving data from the first network node via the first PCC, and wherein the communicating with the second network node comprises sending data to and receiving data from the second network node via the SCC.

12. The method of claim 1, wherein the communicating with the first network node comprises sending data to and receiving data from the first network node via the first PCC, and wherein the communicating with the second network node comprises only receiving data from the second network node via the SCC.

13. The method of claim 1, wherein the first PCC carries traffic data and the SCC carries broadcast data for the UE.

14. The method of claim 1, wherein data is sent with hybrid automatic retransmission (HARQ) on the first PCC and without HARQ on the SCC.

15. A method for wireless communication, comprising:
configuring a user equipment (UE) with a first primary component carrier (PCC) for communication with a first network node at a first time and a secondary CC (SCC) for communication with a second network node;
configuring the UE with the SCC for communication with a third network node at a second time after the first time; and
configuring the UE to maintain communication with the first network node via the first PCC during the configuring the UE for communication with the third network node at the second time or between the first time and the second time, wherein handover from the first network node via the first PCC to another network node via a second PCC is not performed for the UE while the UE communicates with the first network node via the first PCC.

16. The method of claim 15, further comprising:
configuring the UE with another SCC for communication with at least one other network node at the first time.

17. The method of claim 15, further comprising:
adding or removing the SCC from a configuration of the UE during a first time period when the first PCC is configured for the UE.

18. The method of claim 15, further comprising:
sending a grant to the UE for data transmission on the first PCC and the SCC.

19. The method of claim 15, further comprising:
sending a first grant to the UE for data transmission on the first PCC; and
sending a second grant to the UE for data transmission on the SCC.

20. The method of claim 15, further comprising:
scheduling data transmission on the first PCC and the SCC for the UE with centralized scheduling.

21. The method of claim 15, further comprising:
scheduling data transmission on the first PCC and the SCC for the UE with de-centralized scheduling.

22. The method of claim 15, wherein the first PCC carries designated control information for the UE, and wherein the SCC carries data for the UE.

23. The method of claim 15, wherein the first PCC carries data of a first type for the UE, and wherein the SCC carries data of a second type for the UE.

24. The method of claim 15, wherein the first PCC and the SCC are independently configured for the UE.

25. The method of claim 15, wherein the UE sends data to and receives data from the first network node via the first PCC and further sends data to and receives data from the second network node via the SCC.

26. The method of claim 15, wherein the UE sends data to and receives data from the first network node via the first PCC and only receives data from the second network node via the SCC.

27. The method of claim 15, wherein the first PCC carries traffic data and the SCC carries broadcast data for the UE.

28. The method of claim 15, wherein data is sent with hybrid automatic retransmission (HARQ) on the first PCC and without HARQ on the SCC.

29. The method of claim 15, wherein the second network node comprises a relay.

30. An apparatus for wireless communication, comprising:
means for communicating at a first time, by a user equipment (UE), with a first network node via a first primary component carrier (PCC) and a second network node via a secondary CC (SCC);
means for establishing communication, by the UE, with a third network node via the SCC at a second time following the first time; and
means for maintaining communication with the first network node via the first PCC without triggering handover from the first network node via the first PCC to another network node via a second PCC at the UE during the means for establishing communication with the third network node at the second time between the first time and the second time.

31. The apparatus of claim 30, further comprising:
means for deactivating communication with the second network node via the SCC after leaving a coverage area of the second network node, wherein the means for deactivating fails to trigger handover at the UE.

32. The apparatus of claim 30, further comprising:
means for communicating with at least one additional network node by the UE via at least one additional SCC at the first time.

33. The apparatus of claim 32, each of the at least one additional network node being added to or removed from a configuration of the UE during the first time.

34. The apparatus of claim 30, further comprising:
means for receiving at least one grant for data transmission on the first PCC and SCC.

35. The apparatus of claim 34, wherein scheduling of data transmission for the UE on the first PCC and SCC is centralized.

36. The apparatus of claim 30, wherein the first PCC carries designated control information for the UE, and wherein the SCC carries data for the UE.

37. The apparatus of claim 30, wherein the first PCC and the SCC are independently configured for the UE.

38. The apparatus of claim 30, wherein the second network node comprises an access point, and wherein the SCC is within an unlicensed band.

39. The apparatus of claim 30, wherein the second network node comprises a relay.

40. The apparatus of claim 30, wherein the means for communicating with the first network node comprises means for sending data to and means for receiving data from the first network node via the first PCC, and wherein the means for communicating with the second network node comprises means for sending data to and means for receiving data from the second network node via the SCC.

41. The apparatus of claim 30, wherein the means for communicating with the first network node comprises means for sending data to and means for receiving data from the first network node via the first PCC, and wherein the means for communicating with the second network node comprises only means for receiving data from the second network node via the SCC.

42. The apparatus of claim 30, wherein the first PCC carries traffic data and the SCC carries broadcast data for the UE.

43. The apparatus of claim 30, wherein data is sent with hybrid automatic retransmission (HARQ) on the first PCC and without HARQ on the SCC.

44. An apparatus for wireless communication, comprising:
means for configuring a user equipment (UE) with a first primary component carrier (PCC) for communication with a first network node at a first time and a secondary CC (SCC) for communication with a second network node;
means for configuring the UE with the SCC for communication with a third network node at a second time after the first time; and
means for configuring the UE to maintain communication with the first network node via the first PCC during the means for configuring the UE for communication with the third network node at the second time of between the first time and the second time, wherein handover from the first network node via the first PCC to another network node via a second PCC is not performed for the UE while the UE communicates with the first network node via the first PCC.

45. The apparatus of claim 44, further comprising:
means for configuring the UE with another SCC for communication with at least one other network node at the first time.

46. The apparatus of claim 44, further comprising:
means for adding or removing the SCC from a configuration of the UE during a first time period when the first PCC is configured for the UE.

47. The apparatus of claim 44, further comprising:
means for sending a grant to the UE for data transmission on the first PCC and the SCC.

48. The apparatus of claim 44, further comprising:
means for sending a first grant to the UE for data transmission on the first PCC; and
means for sending a second grant to the UE for data transmission on the SCC.

49. The apparatus of claim 44, further comprising:
means for scheduling data transmission on the first PCC and the SCC for the UE with centralized scheduling.

50. The apparatus of claim 44, further comprising:
means for scheduling data transmission on the first PCC and the SCC for the UE with de-centralized scheduling.

51. The apparatus of claim 44, wherein the first PCC carries designated control information for the UE, and wherein the SCC carries data for the UE.

52. The apparatus of claim 44, wherein the first PCC carries data of a first type for the UE, and wherein the SCC carries data of a second type for the UE.

53. The apparatus of claim 44, wherein the first PCC and the SCC are independently configured for the UE.

54. The apparatus of claim 44, wherein the UE sends data to and receives data from the first network node via the first PCC and further sends data to and receives data from the second network node via the SCC.

55. The apparatus of claim 44, wherein the UE sends data to and receives data from the first network node via the first PCC and only receives data from the second network node via the SCC.

56. The apparatus of claim 44, wherein the first PCC carries traffic data and the SCC carries broadcast data for the UE.

57. The apparatus of claim 44, wherein data is sent with hybrid automatic retransmission (HARQ) on the first PCC and without HARQ on the SCC.

58. The apparatus of claim 44, wherein the second network node comprises a relay.

59. A computer program product for wireless communications in a wireless network, comprising:
a non-transitory computer-readable medium having program code recorded thereon, the program code including:
program code for causing a computer to communicate at a first time, by a user equipment (UE), with a first network node via a first primary component carrier (PCC) and a second network node via a secondary CC (SCC);
program code for causing a computer to establish communication, by the UE, with a third network node via the SCC at a second time following the first time; and
program code for causing a computer to maintain communication with the first network node via the first PCC without triggering handover from the first network node via the first PCC to another network node via a second PCC at the UE during execution of the program code for causing a computer to establish communication with the third network node at the second time or between the first time and the second time.

60. The computer program product of claim 59, further comprising:
program code for causing a computer to deactivate communication with the second network node via the SCC after leaving a coverage area of the second network node, wherein the program code for causing a computer to deactivate fails to trigger handover at the UE.

61. The computer program product of claim 59, further comprising:
program code for causing a computer to communicate with at least one additional network node by the UE via at least one additional SCC at the first time.

62. The computer program product of claim 59, wherein the program code for causing a computer to communicate with the first network node comprises program code for causing a computer to send data to and receive data from the first network node via the first PCC, and wherein the program code for causing a computer to communicate with the second network node comprises program code for causing a computer to send data to and receive data from the second network node via the SCC.

63. The computer program product of claim 59, wherein the program code for causing a computer to communicate with the first network node comprises program code for causing a computer to send data to and receive data from the first network node via the first PCC, and wherein the program code for causing a computer to communicate with the second network node comprises only program code for causing a computer to receive data from the second network node via the SCC.

64. A computer program product for wireless communications in a wireless network, comprising:
a non-transitory computer-readable medium having program code recorded thereon, the program code including:
program code for causing a computer to configuring a user equipment (UE) with a first primary component carrier (PCC) for communication with a first network node at a first time and a secondary CC (SCC) for communication with a second network node;
program code for causing a computer to configure the UE with the SCC for communication with a third network node at a second time after the first time; and
program code for causing a computer to configure the UE to maintain communication with the first network node via the first PCC during the configuring the UE for communication with the third network node at the second time or between the first time and the second time, wherein handover from the first network node via the first PCC to another network node via a second PCC is not performed for the UE while the UE communicates with the first network node via the first PCC.

65. The computer program product of claim 64, further comprising:
program code for causing a computer to configure the UE with another SCC for communication with at least one other network node at the first time.

66. The computer program product of claim 64, further comprising:
program code for causing a computer to add or remove the SCC from a configuration of the UE during a first time period when the first PCC is configured for the UE.

67. The computer program product of claim 64, wherein the UE sends data to and receives data from the first network node via the first PCC and further sends data to and receives data from the second network node via the SCC.

68. The computer program product of claim 64, wherein the UE sends data to and receives data from the first network node via the first PCC and only receives data from the second network node via the SCC.

69. The computer program product of claim 64, wherein the first PCC carries traffic data and the SCC carries broadcast data for the UE.

70. An apparatus configured for wireless communication, the apparatus comprising:
at least one processor; and
a memory coupled to the at least one processor,
wherein the at least one processor is configured:
to communicate at a first time, by a user equipment (UE), with a first network node via a first primary component carrier (PCC) and a second network node via a secondary CC (SCC);
to establish communication, by the UE, with a third network node via the SCC at a second time following the first time; and
to maintain communication with the first network node via the first PCC without triggering handover from the first network node via the first PCC to another network node via a second PCC at the UE during establishment of communication with the third network node at the second time or between the first time and the second time.

71. The apparatus of claim 70, further comprising configuration of the at least one processor:
to deactivate communication with the second network node via the SCC after leaving a coverage area of the second network node, wherein the deactivation fails to trigger handover at the UE.

72. The apparatus of claim 70, further comprising configuration of the at least one processor:
to communicate with at least one additional network node by the UE via at least one additional SCC at the first time.

73. The apparatus of claim 70, wherein the configuration of the at least one processor to communicate with the first network node comprises configuration of the at least one processor to send data to and receive data from the first network node via the first PCC, and wherein the configuration of the at least one processor to communicate with the second network node comprises configuration of the at least one processor to send data to and receive data from the second network node via the SCC.

74. The apparatus of claim 70, wherein the configuration of the at least one processor to communicate with the first network node comprises configuration of the at least one processor to send data to and receive data from the first network node via the first PCC, and wherein the configuration of the at least one processor to communicate with the second network node comprises only configuration of the at least one processor to receive data from the second network node via the SCC.

75. An apparatus configured for wireless communication, the apparatus comprising:
at least one processor; and
a memory coupled to the at least one processor,
wherein the at least one processor is configured:
to configuring a user equipment (UE) with a first primary component carrier (PCC) for communication with a first network node at a first time and a secondary CC (SCC) for communication with a second network node;

to configure the UE with the SCC for communication with a third network node at a second time after the first time; and to configure the UE to maintain communication with the first network node via the first PCC during the configuring the UE for communication with the third network node at the second time or between the first time and the second time, wherein handover from the first network node via the first PCC to another network node via a second PCC is not performed for the UE while the UE communicates with the first network node via the first PCC.

76. The apparatus of claim 75, further comprising configuration of the at least one processor:

to configure the UE with another SCC for communication with at least one other network node at the first time.

77. The apparatus of claim 75, further comprising configuration of the at least one processor:

to add or remove the SCC from a configuration of the UE during a first time period when the first PCC is configured for the UE.

78. The apparatus of claim 75, wherein the UE sends data to and receives data from the first network node via the first PCC and further sends data to and receives data from the second network node via the SCC.

79. The apparatus of claim 75, wherein the UE sends data to and receives data from the first network node via the first PCC and only receives data from the second network node via the SCC.

80. The apparatus of claim 75, wherein the first PCC carries traffic data and the SCC carries broadcast data for the UE.

* * * * *